US012717353B1

(12) United States Patent
Ivanov

(10) Patent No.: US 12,717,353 B1
(45) Date of Patent: Aug. 25, 2026

(54) MICRO DRIVE UNITS AND ASSOCIATED METHODS OF OPERATION

(71) Applicant: Amazon Technologies, Inc., Seattle, WA (US)

(72) Inventor: Yuri Anatoly Ivanov, Lexington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 418 days.

(21) Appl. No.: 18/538,754

(22) Filed: Dec. 13, 2023

(51) Int. Cl.

| | |
|---|---|
| ***G05D 1/695*** | (2024.01) |
| ***B65G 1/04*** | (2006.01) |
| ***B65G 1/06*** | (2006.01) |
| ***G05D 1/667*** | (2024.01) |
| ***G05D 105/28*** | (2024.01) |

(52) U.S. Cl.
CPC .......... *G05D 1/696* (2024.01); *B65G 1/0492* (2013.01); *B65G 1/065* (2013.01); *G05D 1/667* (2024.01); *G05D 2105/28* (2024.01)

(58) Field of Classification Search
CPC .... G05D 1/696; G05D 1/667; G05D 2105/28; B65G 1/0492; B65G 1/065
See application file for complete search history.

(56) References Cited

U.S. PATENT DOCUMENTS

2018/0303346 A2* 10/2018 Lepek .................. B60P 1/6445
2021/0252910 A1* 8/2021 Wang .................... B25J 11/009
2023/0415993 A1* 12/2023 Heggebø ............. B65G 1/0464

FOREIGN PATENT DOCUMENTS

CN 210910000 U * 7/2020

OTHER PUBLICATIONS

Guizzo, Erico, “A Robot That Balances on a Ball”, IEEE Spectrum, IEEE, https://spectrum.ieee.org, Apr. 29, 2010, URL: https://spectrum.ieee.org/042910-a-robot-that-balances-on-a-ball, 10 pages.

* cited by examiner

*Primary Examiner* — Ernesto A Suarez
*Assistant Examiner* — Laurence R Brothers
(74) *Attorney, Agent, or Firm* — Athorus, PLLC

(57) ABSTRACT

Micro drive units may comprise simple, small, lightweight, safe, fast, efficient, flexible, and adaptable robotic drive units. The micro drive units may operate individually to perform various material handling operations, or may operate collectively in groups, such as mobile groups, temporary conveyances, or temporary motion fields, to perform various material handling operations.

20 Claims, 13 Drawing Sheets

300B
310B
102

300A
310A
102

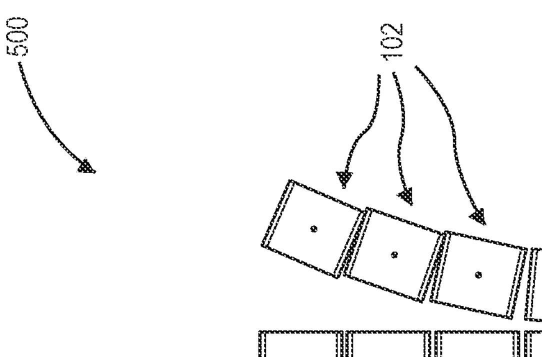
FIG. 5
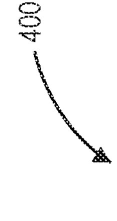
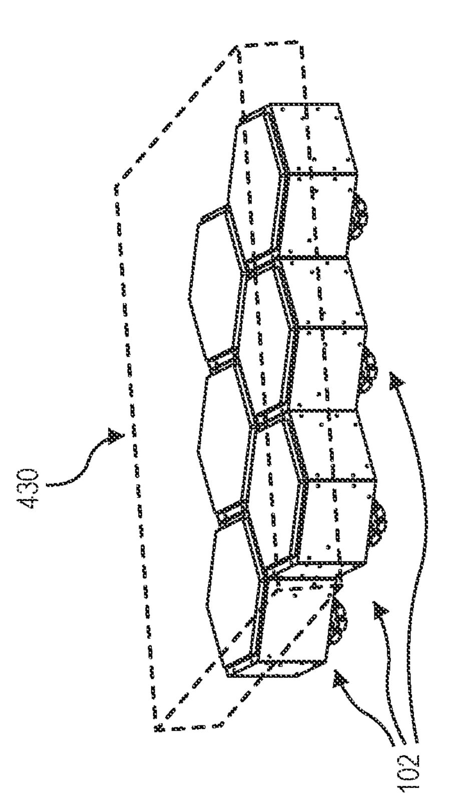
FIG. 4

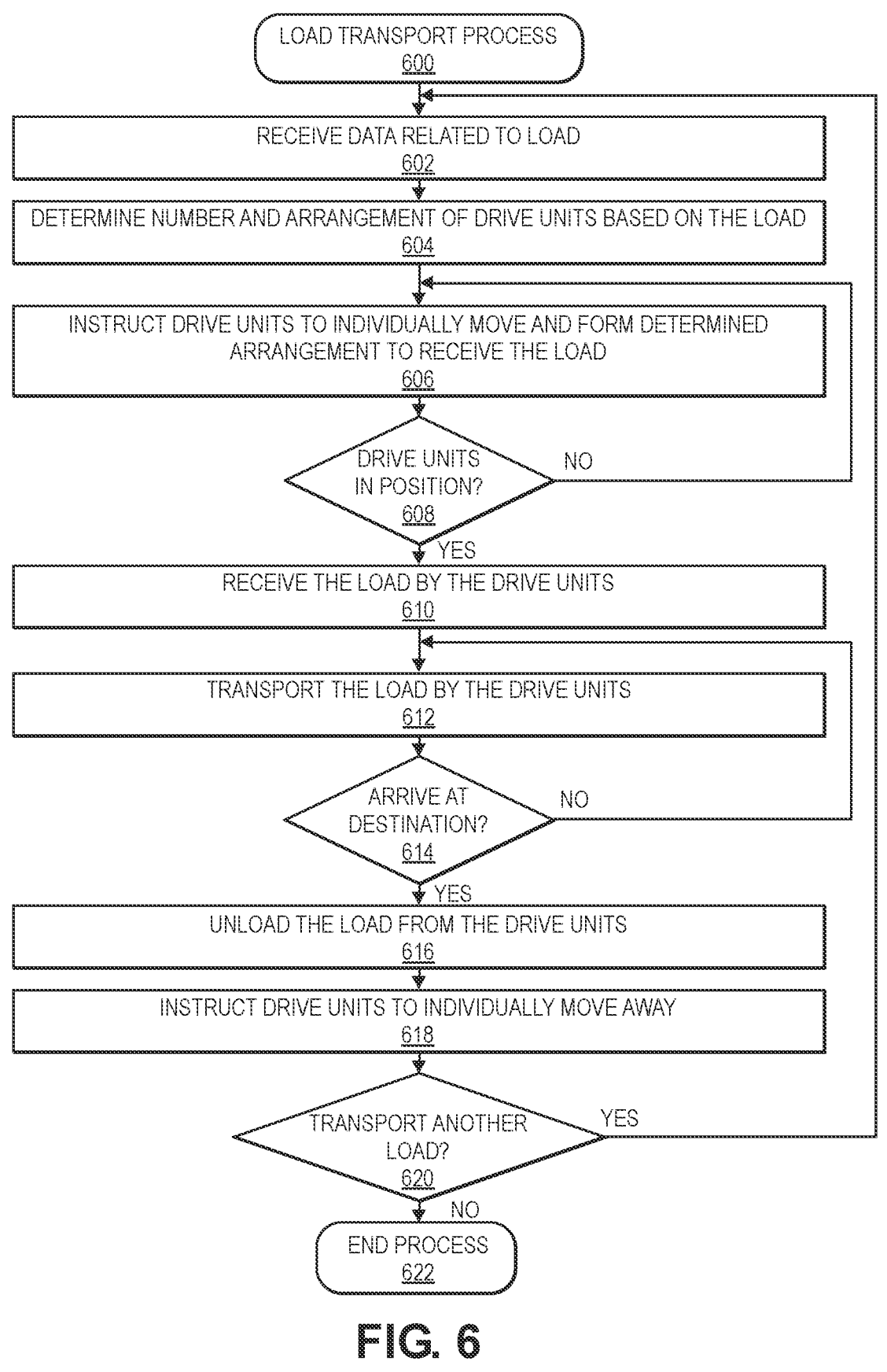

LOAD TRANSPORT PROCESS
600

RECEIVE DATA RELATED TO LOAD
602

DETERMINE NUMBER AND ARRANGEMENT OF DRIVE UNITS BASED ON THE LOAD
604

INSTRUCT DRIVE UNITS TO INDIVIDUALLY MOVE AND FORM DETERMINED ARRANGEMENT TO RECEIVE THE LOAD
606

DRIVE UNITS IN POSITION?
608

NO

YES

RECEIVE THE LOAD BY THE DRIVE UNITS
610

TRANSPORT THE LOAD BY THE DRIVE UNITS
612

ARRIVE AT DESTINATION?
614

NO

YES

UNLOAD THE LOAD FROM THE DRIVE UNITS
616

INSTRUCT DRIVE UNITS TO INDIVIDUALLY MOVE AWAY
618

TRANSPORT ANOTHER LOAD?
620

YES

NO

END PROCESS
622

FIG. 6

MICRO DRIVE UNITS AND ASSOCIATED METHODS OF OPERATION

BACKGROUND

Many companies may store, package, and ship items and/or groups of items from material handling facilities. For example, many companies may store items in a material handling facility and ship items to various destinations (e.g., customers, stores) from the material handling facility. In addition, various automated, autonomous, or robotic vehicles, machinery, or systems may facilitate various material handling processes and tasks within a facility. However, conventional automated machinery, such as conveyors or automated guided vehicles (AGVs), may generally be large, expensive, complicated, fixed, specialized, inflexible, and/or unadaptable. Accordingly, there is a need for fast, simple, light, safe, efficient, and flexible robotic drive units and associated methods of operation within a material handling facility.

BRIEF DESCRIPTION OF THE DRAWINGS

FIG. 4 is a schematic, perspective view diagram of an example arrangement of a plurality of micro drive units to transport a load, in accordance with implementations of the present disclosure.

FIG. 5 is a schematic, top down view diagram of an example arrangement of a plurality of micro drive units to form a conveyance, in accordance with implementations of the present disclosure.

FIG. 6 is a flow diagram illustrating an example load transport process using micro drive units, in accordance with implementations of the present disclosure.

DETAILED DESCRIPTION

Figure 1:
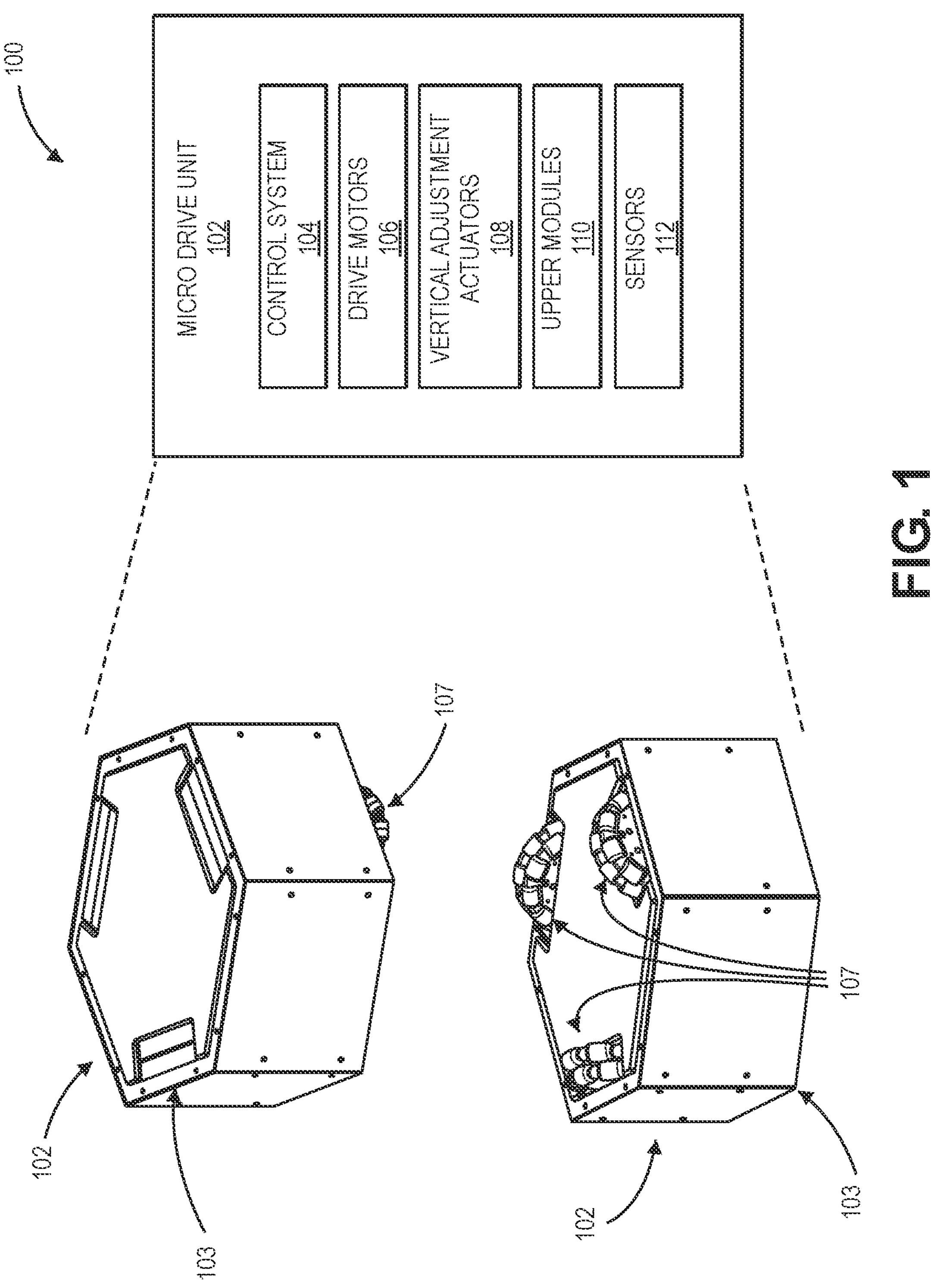
FIG. 1 illustrates schematic, perspective view diagrams of an example micro drive unit, in accordance with implementations of the present disclosure.

As is set forth in greater detail below, implementations of the present disclosure are directed to micro drive units and associated methods of operation, e.g., within a material handling facility.

Conventional automated or robotic equipment or machinery within material handling facilities may include conveyor systems, sortation systems, automated guided vehicles (AGVs), or other similar material transport systems. Such conventional equipment or machinery may generally be large, expensive, complicated, fixed, specialized, inflexible, and/or unadaptable. For example, conveyor or sortation systems may be large, expensive, and complicated mechanical systems, and after installation and/or during operation, conveyor or sortation systems may be fixed, specialized, inflexible, and unadaptable to changing needs or processes of material handling facilities. Accordingly, there is a need for fast, simple, light, safe, efficient, and flexible robotic drive units and associated methods of operation within a material handling facility.

In example embodiments described herein, micro drive units may comprise simple, lightweight, and low cost robotic drive units that can perform various material transport operations similar to those conventionally performed by conveyor systems, sortation systems, AGVs, or other similar equipment. The micro drive units may also be safe, fast, and flexible, and may be reconfigured into various formations, arrangements, or configurations depending on changing or evolving needs of material handling facilities in which they operate.

Example micro drive units may have various sizes, shapes, or form factors, e.g., hexagonal, triangular, rectangular, square, circular, oval, or other shapes or form factors. In addition, the micro drive units may comprise a control system, a plurality of drive motors, one or more power supplies, and one or more communication devices. Further, the micro drive units may also comprise one or more vertical adjustment actuators, one or more upper modules and associated actuators, and/or one or more sensors, actuators, signaling devices, or other components.

In example embodiments, the micro drive units described herein may perform various operations or processes, e.g., material transport processes associated with a material handling facility. For example, the micro drive units may individually or collectively transport materials between locations associated with a material handling facility. In addition, the micro drive units may collectively arrange themselves to form conveyance mechanisms on-demand between locations associated with a material handling facility. Further, the micro drive units may collectively arrange themselves to form motion fields on-demand between locations associated with a material handling facility.

In further example embodiments, the micro drive units described herein may be moved, transported, and/or charged using mobile base stations. The mobile base stations may comprise AGVs, larger and specialized robotic drive units, or other automated vehicles. A plurality of micro drive units may be received by the mobile base stations, and the mobile base stations may transport the micro drive units between locations associated with a material handling facility, as well as provide power for charging of and/or enable power distribution among the micro drive units.

Using the example micro drive units described herein, various material transport operations or processes within a material handling facility may be performed in a flexible and adaptive manner. Moreover, the micro drive units may be simple, safe, lightweight, fast, and efficient, and may further enable safe operations in coordination with human agents or associates. Furthermore, in contrast with conventional fixed and inflexible systems presenting a single point of failure that can adversely affect various operations within a material handling facility, the potential malfunction, fault, or failure of a single micro drive unit may be easily and quickly mitigated by substitution of one or more functional micro drive units within a facility.

FIG. 1 illustrates schematic, perspective view diagrams 100 of an example micro drive unit, in accordance with implementations of the present disclosure.

As shown in FIG. 1, the example micro drive unit 102 may comprise a body, frame, or structure 103 that receives, houses, or encloses various components described herein. For example, the micro drive unit 102 may comprise a control system 104, a plurality of drive motors 106 operatively connected to a plurality of drive wheels 107, one or more vertical adjustment actuators 108, one or more upper modules 110 and associated actuators, and/or one or more sensors 112. Further details of the control system 104 are described herein at least with respect to FIG. 2.

In additional example embodiments, the micro drive unit 102 may also include various other components, actuators, sensors, or signaling devices, such as cameras, scanners, lights, displays, other visual input/output devices, microphones, speakers, other audio input/output devices, servos, solenoids, motors, or other actuators to perform various aspects of material transport operations. Further, the micro drive units 102 may also include location sensors, inertial measurement units, accelerometers, gyroscopes, magnetometers, odometers, speedometers, encoders, weight, pressure, or contact sensors, proximity sensors, radiofrequency identification (RFID) readers, radar, LIDAR (light detection and ranging), or other range detection sensors, or other components, actuators, or sensors.

As illustrated in FIG. 1, the body 103 of the micro drive unit 102 may comprise a tileable, combinable, or connectible shape or form factor that can be arranged into one or more formations with other micro drive units without leaving or forming any gaps between adjacent units. One example tileable, combinable, or connectible shape or form factor may comprise a substantially hexagonal shape or form factor, e.g., a regular hexagonal prism. The body 103 may be formed of one or more plates, brackets, or surfaces that are coupled or connected together, e.g., via fasteners, adhesives, welding, or other joining or attachment methods. In some examples, the micro drive unit 102 may have dimensions of approximately 270 mm from one flat face to an opposing flat face of the hexagonal shape, approximately 308 mm from one corner to an opposing corner of the hexagonal shape, approximately 125 mm height of the body 103, approximately 150 mm height of the body 103 and drive wheels 107, or other similar dimensions, and a cargo or weight carrying capacity of approximately 5 lbs, approximately 15 lbs, approximately 20 lbs, or other similar weights. The body 103 may also be formed of various materials, such as metals, plastics, composites, others, or combinations thereof. For the example micro drive unit 102 of FIG. 1, the plurality of drive wheels 107 and associated drive motors 106 may be positioned substantially within an outer periphery of the body 103, and portions of the drive wheels 107 may selectively extend or protrude from lower or upper surfaces of the body 103 via corresponding slots or holes in the body 103 in order to perform various material transport operations described herein.

The example micro drive unit 102 may comprise three sets of drive wheels 107, although only two sets of drive wheels 107 are visible in FIG. 1. The three sets of drive wheels 107 may be positioned approximately 120 degrees around a center of the body 103 relative to each other. Each set of drive wheels 107 may be operatively connected to and rotated by a respective drive motor 106, such that the example micro drive unit 102 may comprise three drive motors 106 that are each operatively coupled to rotate or drive respective sets of the drive wheels 107. The drive motors 106 may comprise various types of actuators, such as servo motors, rotary actuators, hub motors, or other types of actuators, which may be coupled directly or indirectly to respective drive wheels 107 via drive shafts, transmissions, or other drivetrains. The sets of drive wheels 107 may be formed of various materials, such as metals, plastics, composites, rubber, silicone, others, or combinations thereof.

As shown in FIG. 1, the drive wheels 107 may comprise omnidirectional wheels, or omni wheels. Generally, an omnidirectional wheel may comprise a relatively larger main wheel that is rotated about a rotational axis by a drive motor, e.g., via a drive shaft, transmission, or drivetrain. In addition, around an outer periphery of a main wheel of an omnidirectional wheel, a plurality of relatively smaller rollers may be positioned, with each smaller roller having a rotational axis that is transverse to the rotational axis of the main wheel and that extends approximately tangent to the outer periphery of the main wheel at the position of the smaller roller. As a result, an omnidirectional wheel may allow movement in substantially any direction via various combinations of active, driven rotation of the main wheel about its rotational axis together with independent, passive rotations of one or more smaller rollers around the outer periphery of the main wheel about their respective rotational axes.

In addition, as shown in FIG. 1, each set of drive wheels 107 may comprise two or more omnidirectional wheels that have an angular offset around the rotational axes of the main wheels relative to each other. The angular offset may be defined such that in any rotational position of a single set of drive wheels 107, at least one smaller roller positioned at the outer periphery of at least one of the main wheels may be in contact with a surface or floor on which the single set of drive wheels 107 is positioned and/or moving.

Using the three sets of drive wheels 107 that are independently driven by respective drive motors 106 and controllers, the micro drive unit 102 may move in substantially any direction on a surface or floor on which the micro drive unit 102 is positioned. Because each of the three sets of drive wheels 107 are offset 120 degrees around the center of the body 103 of the micro drive unit 102, the rotational axes of the three sets of drive wheels 107 are also offset approximately 120 degrees relative to each other around the center of the body 103. As a result, by independent and/or combined rotation of the three sets of drive wheels 107 using respective drive motors 106, the micro drive unit 102 may be substantially omnidirectional relative to a surface or floor on which the micro drive unit 102 is positioned.

Further, although the three sets of drive wheels 107 can enable movement in substantially any direction on a surface or floor without requiring turning or rotation of the micro drive unit 102 to move in any specific direction, the three sets of drive wheels 107 can also cause turning or rotation of the micro drive unit 102 as a whole, e.g., rotation around a center of the body 103 of the micro drive unit 102, or rotation while moving in a specific direction. Such turning or rotation of a micro drive unit 102 may be desired, for example, if a load is to be received in a particular orientation by the micro drive unit 102 from an upstream system or process, if a load is to be transferred or released in particular orientation from the micro drive unit 102 to a downstream system or process, during transport of a load through a facility, and/or for various other reasons.

In other example embodiments, the micro drive units 102 may have other sizes, shapes, or form factors, such as triangular, square, rectangular, circular, oval, or other regular, irregular, tileable, combinable, and/or connectible shapes or form factors. In addition, the micro drive units 102 may have other numbers, sets, or arrangements of drive wheels 107 and drive motors 106. Moreover, the drive wheels 107 may comprise various other types of wheels, such as standard wheels, mecanum wheels, omnidirectional wheels, caster wheels, or combinations thereof. Further, the drive wheels 107 may be independently or collectively driven by one or more drive motors 106, and may have various configurations, such as differential drive configurations, front wheel, rear wheel, or all-wheel drive configurations, steerable wheel configurations, or other configurations or combinations thereof.

In additional example embodiments described herein, the micro drive unit 102 may include one or more vertical adjustment actuators 108. For example, the vertical adjustment actuators 108 may enable movement of the drive wheels 107 and the body 103 in a vertical direction relative to each other. The vertical adjustment actuators 108 may comprise various actuators, such as motors, servos, solenoids, pneumatic cylinders, lead screws, ball screws, scissor lifts, or other types of actuators. In addition, the vertical adjustment actuators 108 may be operatively coupled between the body 103 and the drive wheels 107 and/or drive motors 106, in order to cause vertical movement of the drive wheels 107 relative to the body 103.

In some examples, the vertical adjustment actuators 108 may cause movement of the drive wheels 107 relative to the body 103 to raise or lower a vertical height of the body 103 relative to a surface or floor on which the micro drive unit 102 is operating. Such vertical adjustment of the height of the body 103 of the micro drive unit 102 may enable movement of the micro drive unit 102 under or through smaller spaces or passages, and/or may enable navigation of the micro drive unit 102 over various types of surfaces or surface features, e.g., bumps, ramps, protrusions, indentations, or others. In addition, vertical adjustment of the height of the body 103 of the micro drive unit 102 may enable raising and/or lowering of loads, items, or other materials received by or in contact with an upper surface of the micro drive unit 102. Further details of an example load transport using micro drive units are described herein at least with respect to FIGS. 4-7.

In other examples, the vertical adjustment actuators 108 may cause movement of the drive wheels 107 relative to the body 103 such that the drive wheels 107 may be positioned to extend from an upper portion of the body 103, which may be similar to an upside down or inverted configuration of the micro drive unit 102 as illustrated in the lower left portion of FIG. 1. Such vertical adjustment of the drive wheels 107 of the micro drive unit 102 to be positioned to extend from an upper portion of the body 103 may enable operation of one or more micro drive units 102 as a motion field, which may be configured to transport various loads, items, or materials via operations of the drive motors 106 and drive wheels 107. Further details of an example motion field using micro drive units are described herein at least with respect to FIGS. 8, 9, 12, and 13.

In alternative examples, the vertical adjustment actuators 108 may cause movement of portions of the body 103 relative to other portions of the body 103 of the micro drive unit 102. For example, some of the one or more plates, brackets, or surfaces of the body 103 of the micro drive unit 102 may be movably coupled together, in order to adjust a vertical height or position of some portions of the body 103, e.g., an upper plate and/or upper portions of the side plates, relative to other portions of the body 103, e.g., a lower plate and/or lower portions of the side plates.

The vertical adjustment actuators 108 may be operatively coupled between different portions of the body 103, in order to cause relative vertical movement of the different portions of the body 103. For example, an upper plate or portion of the body 103 of a micro drive unit 102 may move, expand, contract, and/or telescope vertically relative to a lower plate or portion of the body 103 of the micro drive unit 102. In such examples, the vertical size or height of the body 103 of the micro drive unit 102 may change, e.g., may become smaller or shorter to enable movement under or in small passages or spaces, or to receive and lower items or loads, and/or may become larger or taller to receive or lift items or loads, or to increase visibility of the micro drive unit 102.

In further example embodiments described herein, the micro drive unit 102 may include one or more upper modules 110 and associated actuators. For example, the upper modules 110 may comprise platforms, trays, conveyor sections, turntables, robotic arms or manipulators, lifting tables or platforms, or other types of modules. The upper modules 110 may comprise various actuators, such as motors, servos, solenoids, pneumatic cylinders, lead screws, ball screws, scissor lifts, or other types of actuators. In addition, the upper modules 110 may be removably or replaceably coupled or attached to an upper portion of the body 103 of the micro drive unit 102, and the upper modules 110 may communicate, via wired or wireless connections, to transmit and receive data, instructions, and/or power to and from the control system 104 of the micro drive unit 102. Further details of some example upper modules 110 of micro drive units 102 are described herein at least with respect to FIGS. 3A and 3B.

In other example embodiments described herein, the micro drive unit 102 may include one or more sensors 112. For example, the sensors 112 may comprise cameras, scanners, other vision systems, microphones, location sensors, inertial measurement units, accelerometers, gyroscopes, magnetometers, odometers, speedometers, encoders, weight, pressure, or contact sensors, proximity sensors, radiofrequency identification (RFID) readers, radar, LIDAR (light detection and ranging) or other range detection sensors, or other types of sensors. The sensors 112 may capture various data during movement, transport, or other operations by the micro drive units 102, and the various data may be processed and used to enable various operations or processes. For example, the data from sensors 112 may be used to facilitate navigation, location determination, obstacle avoidance, load receipt, load release, conveyor formation, motion field formation, loading onto or unloading from mobile base stations, and/or various other functions or processes by the micro drive units 102.

The example micro drive unit 102 illustrated in FIG. 1 may enable operation of a group of micro drive units 102 in a compact or close configuration or arrangement, due to the tileable, combinable, or connectible form factor. For example, because the drive wheels 107 of the micro drive units 102 are positioned within an outer periphery of the body 103 of the micro drive units 102, a group of micro drive units 102 may be positioned adjacent to or in contact with each other to form a substantially continuous upper surface upon which one or more items, loads, or materials may be received, loaded, and/or transported. In some examples, multiple micro drive units 102 may be positioned adjacent to and in contact with each other to form a substantially honeycomb-like arrangement of micro drive units 102 that may not include any gaps or spaces between adjacent micro drive units 102.

As a result, a group of micro drive units 102 in a load transport configuration may not include any gaps or spaces between adjacent micro drive units 102, as shown and described herein at least with respect to FIG. 4. In similar manner, a group of micro drive units 102 may form a temporary conveyance or temporary motion field that enables reduction or elimination of gaps or spaces between adjacent micro drive units 102, as shown and described herein at least with respect to FIGS. 5 and 8.

Figure 2:
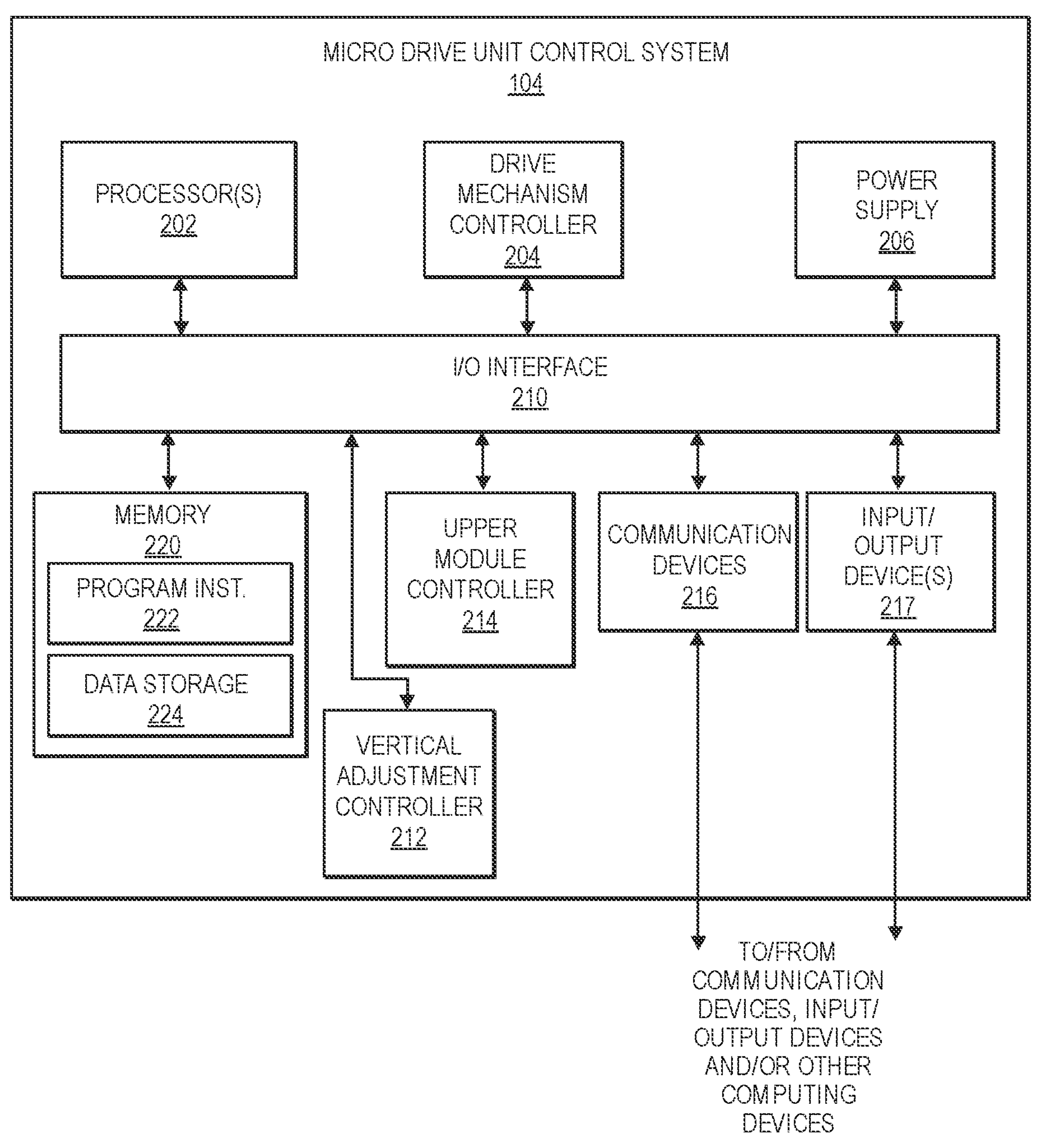
FIG. 2 is a block diagram illustrating various components of an example micro drive unit control system, in accordance with implementations of the present disclosure.

FIG. 2 is a block diagram illustrating various components of an example micro drive unit control system 104, in accordance with implementations of the present disclosure.

In various examples, the block diagram may be illustrative of one or more aspects of a micro drive unit control system 104 that may be used to implement the various systems and processes discussed herein. In the illustrated implementation, the micro drive unit control system 104 includes one or more processors 202, coupled to a non-transitory computer-readable storage medium 220 via an input/output (I/O) interface 210. The micro drive unit control system 104 may also include a drive mechanism controller 204 and a power supply or battery 206. The micro drive unit control system 104 may further include a vertical adjustment controller 212, an upper module controller 214, one or more communication devices 216, and one or more input/output devices 217.

In various implementations, the micro drive unit control system 104 may be a uniprocessor system including one processor 202, or a multiprocessor system including several processors 202 (e.g., two, four, eight, or another suitable number). The processor(s) 202 may be any suitable processor capable of executing instructions, such as CPUs (central processing units), TPUs (tensor processing units), or other types of processors. In some examples, TPUs may comprise or enable on-board machine learning-based processing and control modules to perform the various operations described herein. For example, in various implementations, the processor(s) 202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 202 may commonly, but not necessarily, implement the same ISA.

The non-transitory computer-readable storage medium 220 may be configured to store executable instructions, applications, drivers, and/or data, such as micro drive unit data, attributes, or characteristics, hardware or component data, navigation system data, drive mechanism data, vertical adjustment data, upper module data, sensor data, payload, load, item, or material data, and/or other data items accessible by the processor(s) 202. In various implementations, the non-transitory computer-readable storage medium 220 may be implemented using any suitable memory technology, such as static random-access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 220 as program instructions 222 and data storage 224. In other implementations, program instructions, applications, drivers, and/or data may be received, sent or stored upon different types of computer-accessible media, such as non-transitory media, or on similar media separate from the non-transitory computer-readable storage medium 220 or the micro drive unit control system 104.

Generally, a non-transitory, computer-readable storage medium 220 may include storage media or memory media such as magnetic or optical media, e.g., disk or CD/DVD-ROM, coupled to the micro drive unit control system 104 via the I/O interface 210. Program instructions and data stored via a non-transitory computer-readable medium may be transmitted by transmission media or signals, such as electrical, electromagnetic, or digital signals, which may be conveyed via a communication medium such as a network and/or a wireless link, such as may be implemented via the communication devices 216.

In one implementation, the I/O interface 210 may be configured to coordinate I/O traffic between the processor(s) 202, the non-transitory computer-readable storage medium 220, and any peripheral devices, the communication devices 216 or other peripheral interfaces, such as input/output devices 217. In some implementations, the I/O interface 210 may perform any necessary protocol, timing or other data transformations to convert data signals from one component (e.g., non-transitory computer readable storage medium 220) into a format suitable for use by another component (e.g., processor(s) 202). In some implementations, the I/O interface 210 may include support for devices attached through various types of peripheral buses, such as a variant of the Peripheral Component Interconnect (PCI) bus standard or the Universal Serial Bus (USB) standard, for example. In some implementations, the function of the I/O interface 210 may be split into two or more separate components, such as a north bridge and a south bridge, for example. Also, in some implementations, some or all of the functionality of the I/O interface 210, such as an interface to the non-transitory computer-readable storage medium 220, may be incorporated directly into the processor(s) 202.

The drive mechanism controller 204 may communicate with the processor(s) 202, the non-transitory computer-readable storage medium 220, the vertical adjustment controller 212, the upper module controller 214, and/or other components described herein to adjust the operational characteristics of motors or other actuators, e.g., rotational speeds and directions, associated with each drive wheel to move the micro drive unit along a determined path to a destination and/or to perform other navigational maneuvers or operations, including moving individually, moving collectively, transporting loads, forming conveyors, forming motion fields, moving to mobile base stations, recharging, and/or various other operations or combinations thereof.

The power supply or battery 206 may comprise various types of power supplies, such as batteries, rechargeable batteries, supercapacitors, or other types of power supplies or sources. In addition, the power supply 206 may be removable and/or replaceable. Further, the micro drive unit control system 104 may also include a wired charging port, a wireless charging connection such as magnetic or inductive couplings, or other types of power transfer, distribution, or charging connections to enable recharging or power transfer/distribution of the power supply 206.

The micro drive unit control system 104 may also include a vertical adjustment controller 212 that communicates with the processor(s) 202, the drive mechanism controller 204, the upper module controller 214, the non-transitory computer-readable storage medium 220, and/or other components described herein to adjust or reconfigure a vertical height or position of the drive wheels relative to the body of the micro drive unit to enable various operations, such as moving under obstacles, navigating along various surfaces, receiving loads, releasing loads, transporting loads, forming conveyors, forming motion fields, moving to mobile base stations, recharging, and/or various other operations or combinations thereof.

The micro drive unit control system 104 may also include an upper module controller 214 that communicates with the processor(s) 202, the drive mechanism controller 204, the vertical adjustment controller 212, the non-transitory computer-readable storage medium 220, and/or other components described herein to command, instruct, or otherwise control various upper modules that may be coupled to an upper portion of the micro drive unit to enable various operations, such as receiving loads, releasing loads, transporting or conveying loads, and/or various other operations or combinations thereof.

The communication devices 216 may be configured to allow data to be exchanged between the micro drive unit control system 104, other devices attached to a network, such as other computer systems, control systems, management control systems, material handling system controllers, control systems of other micro drive units, and/or other vehicles, systems, machines, equipment, apparatuses, systems, sensors, or devices associated with various facilities or environments. For example, the communication devices 216 may enable wireless communication between numerous micro drive units, and/or between individual micro drive units and a control system. In various implementations, the communication devices 216 may support communication via wireless general data networks, such as Wi-Fi®, Bluetooth®, Zigbee®, mesh networks, other local proximity or short range communication networks, or others. For example, mesh networks or other short range communications may enable quick, reliable, and robust transmission, sharing, and/or distribution of data or information between multiple micro drive units operating in proximity to each other, e.g., as a collective group. In some examples, data or information detected or captured by various sensors and/or instructions or information received or determined by one or more micro drive units, e.g., obstacles, safety states, traffic, congestion, equipment status, software or firmware updates, or other observations and related information, may be shared or distributed with other micro drive units, thereby improving robustness of operations of all micro drive units. Further, the communication devices 216 may support communication via telecommunications networks such as cellular communication networks, satellite networks, and the like.

Input/output devices 217 may, in some implementations, include one or more imaging devices, scanning devices, thermal sensors, infrared sensors, displays, monitors, touchscreens, other visual input/output devices, microphones, speakers, other audio input/output devices, radar, LIDAR, or other time of flight sensors, GPS sensors, indoor positioning system sensors, position encoders, speedometers, inertial measurement units, accelerometers, gyroscopes, weight, pressure, or contact sensors, various other sensors described herein, etc. Multiple input/output devices 217 may be present and controlled by the micro drive unit control system 104. One or more of these sensors may be utilized to assist in performing the various functions, operations, and processes described herein.

As shown in FIG. 2, the memory may include program instructions 222 which may be configured to implement the example processes and/or sub-processes described above. The data storage 224 may include various data stores for maintaining data items that may be provided for performing the various functions, operations, and processes described herein. For example, the data storage 224 may include micro drive unit data, attributes, or characteristics, hardware or component data, navigation system data, drive mechanism data, vertical adjustment actuator data, upper module data, load, item, or material data, material transport operations data, various sensor data, and/or other data items.

Those skilled in the art will appreciate that the micro drive unit control system 104 is merely illustrative and is not intended to limit the scope of the present disclosure. In particular, the computing system and devices may include any combination of hardware or software that can perform the indicated functions, including other control systems or controllers, computers, network devices, robotic devices, etc. The micro drive unit control system 104 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

While the above examples have been described with respect to ground-based vehicles, the disclosed implementations may also be used for other forms of vehicles, including, but not limited to, aerial vehicles, water-based vehicles, or other types of vehicles or autonomous robots.

In further example embodiments, various micro drive units 102 may have one or more specialized components, actuators, sensors, or signaling devices to perform one or more specialized functions. For example, individual micro drive units 102 may have different types, configurations, or combinations of the various components shown and described herein at least with respect to FIGS. 1 and 2. In this manner, various different functions or capabilities may be distributed among a plurality of micro drive units 102, thereby enabling simple, lightweight, and low cost design of individual micro drive units 102. Collectively, when multiple micro drive units 102 may perform a task, process, or operation together, different micro drive units 102 having different respective capabilities may be gathered or utilized in order to leverage their individual functions and provide desired combined functionality to the collective group of micro drive units 102 as a whole.

One example specialized micro drive unit 102 may include one or more processors and/or memories that are relatively more complex or computationally powerful than other micro drive units. Such a specialized micro drive unit 102 may act as a primary or central controller for a group of micro drive units that are collectively performing a task, process, or operation. In this manner, the specialized micro drive unit 102 may have greater processing power and/or memory capacity to generate commands or instructions for other micro drive units of the collective group, and may thereby coordinate operations for the group of micro drive units. Such specialization may ensure safe, reliable, and coordinated operations of a group of micro drive units.

Another example specialized micro drive unit 102 may include one or more power supplies or power distribution components that have relatively greater capacity or capabilities than other micro drive units. Such a specialized micro drive unit 102 may act as a primary or central power source or power distribution agent for a group of micro drive units that are collectively performing a task, process, or operation. In this manner, the specialized micro drive unit 102 may act as a mobile power source and power distribution agent to ensure sufficient power for other micro drive units of the collective group, and may thereby facilitate coordinated operations for a group of micro drive units. Such specialization may ensure safe, reliable, and efficient operations of a group of micro drive units.

A further example specialized micro drive unit 102 may include one or more communication devices that are relatively more complex or have greater range or capabilities than other micro drive units. Such a specialized micro drive unit 102 may act as a primary or central communication agent for a group of micro drive units that are collectively performing a task, process, or operation. In this manner, the specialized micro drive unit 102 may act as a centralized communication agent between a control system, e.g., associated with a facility and/or various systems, equipment, or machinery, and the group of micro drive units of the collective group, and may thereby facilitate coordinated operations for the group of micro drive units. Such specialization may ensure safe, reliable, and efficient operations of a group of micro drive units.

Yet another example specialized micro drive unit 102 may include one or more lights, light emitting diodes (LEDs), beacons, other electromagnetic emission elements, or other signaling devices that may be activated to illuminate or indicate a location, path, boundary, or other aspects related to navigation of micro drive units. Based on detection of the illuminated or indicated navigational aspects that are emitted by such specialized micro drive units 102, one or more other micro drive units 102 may detect and utilize the illuminated or indicated navigational aspects for respective navigation to various locations, along various paths, and/or within various areas, in order to perform various operations. Such specialization may ensure safe and reliable navigation and corresponding operations of micro drive units.

A still further example specialized micro drive unit 102 may include one or more radar sensors, LIDAR sensors, or other time of flight sensors, and one or more of such specialized micro drive units 102 may be positioned to collectively partition, isolate, or identify a region, area, or boundaries for operations of micro drive units 102. Then, during various operations within the region, the specialized micro drive units 102 may detect, track, or monitor objects within the region to ensure that no unintended agents enter or operate within the region, e.g., other automated vehicles, robotic devices, human agents or associates, or other agents. Such specialization may ensure safe and reliable operations of micro drive units within defined, monitored areas or regions.

Various other example specialized micro drive units 102 may have different additional or peripheral components, actuators, or sensors having greater or different capabilities than other micro drive units. For example, some specialized micro drive units 102 may include different drive motors, drive wheels, or drive configurations to enable different types, directions, speeds, torques, or other aspects of movement or navigation, other specialized micro drive units 102 may include vertical adjustment actuators 108 to enable vertical adjustment of portions of the body 103 and/or drive wheels 107 thereof, and/or further specialized micro drive units 102 may have various different types of upper modules 110 to enable different tasks or operations.

Further, some specialized micro drive units 102 may include various types or combinations of sensors, such as imaging sensors, scanning devices, microphones, location sensors, movement or navigation sensors, load detection or identification sensors, or other types of sensors. As a result, various specialized micro drive units 102 may have greater capabilities to detect different types of data, such as imaging data, scanned identifier data, audio data, location data, movement or navigation data, load identification, receipt, or release data, or various other types of data.

In further example embodiments, various micro drive units 102 may have one or more specialized components, actuators, sensors, or signaling devices, or combinations thereof, according to various specialized roles to be performed. For example, one or more specialized micro drive units may act as guides or navigation aids for a plurality of micro drive units that are operating as a group, e.g., by leading or directing navigation of the group. The specialized micro drive units may act as beacons for a plurality of micro drive units that are operating as a group, e.g., by signaling or transmitting data for actions to be performed by the group. For example, a plurality of the specialized micro drive units may act as a group of beacons to indicate a path for navigation or operations of the group, e.g., by operating at defined or regular spacings or intervals along a line or within a formation of the group. The plurality of specialized micro drive units may include LEDs, light emitting elements, or other signaling devices that may flash, illuminate, or emit various signals with desired characteristics, e.g., to indicate a path, a direction, a speed, a safe region, a restricted region, or other aspects associated with operations of the group.

In addition, one or more specialized micro drive units may act as safety scouts, guards, or sentinels for a plurality of micro drive units that are operating as a group, e.g., by identifying or indicating acceptable regions or areas for performing operations. For example, some specialized micro drive units may include various sensors, such as optical, audio, time of flight, or other types of sensors, to detect, extract, aggregate, and map a region or area for operations of the group, e.g., by identifying obstacles, occupancy, static objects, moving objects, or other aspects of the area. Some of the specialized micro drive units may act as mobile guards or sentinels to maintain safety of operations of the group within an area, e.g., by detecting ingress or movement of other objects or obstacles within a working region for the group. Further specialized micro drive units act as monitors or referees to direct operations of multiple drive units of the group, e.g., to ensure safe operations among the drive units of the group.

As described herein, the example micro drive units 102 may be relatively simple, small, and lightweight. In addition, the example micro drive units 102 may be safe, fast, and efficient and allow safe operations in coordination with human agents or associates. Further, the micro drive units 102 may enable flexible and adaptive performance of various material transport operations, as further described herein. Moreover, by generating or forming a diverse group of specialized micro drive units that have different respective capabilities, the micro drive units 102 may be individually designed or configured as simple, safe, small, fast, and lightweight units, while also collectively providing a diverse and distributed range of capabilities that may be aggregated in various arrangements or combinations as desired to perform particular tasks, processes, or operations.

Figures 3A, 3B:
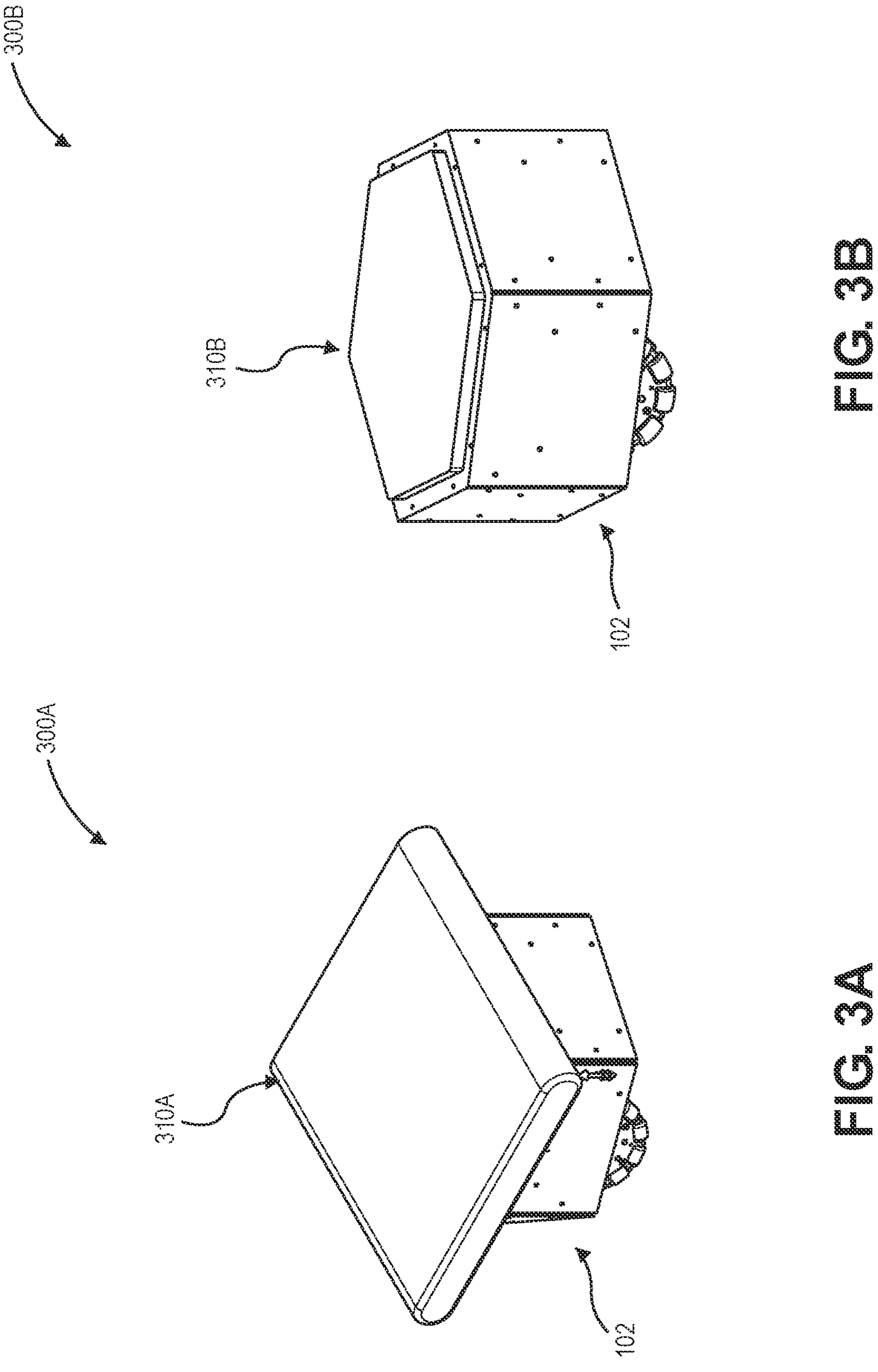
FIG. 3A is a schematic, perspective view diagram of an example micro drive unit having a first example upper module, in accordance with implementations of the present disclosure.
FIG. 3B is a schematic, perspective view diagram of an example micro drive unit having a second example upper module, in accordance with implementations of the present disclosure.

FIG. 3A is a schematic, perspective view diagram 300A of an example micro drive unit having a first example upper module, in accordance with implementations of the present disclosure.

As shown in FIG. 3A, the example micro drive unit 102 may include an upper module 310A that comprises a conveyor or sortation section. For example, the upper module 310A may include a conveyor belt, rollers, sorting shoes, or other movable elements that can receive a load, item, or material onto the upper module 310A and/or transfer or release the load, item, or material off or away from the upper module 310A. The upper module 310A may include one or more actuators to cause movement of the conveyor belt, rollers, or other movable elements, e.g., servos, rotary motors, linear actuators, or other types of actuators.

The upper module 310A may be removably or replaceably coupled or attached to an upper portion of the body 103 of the micro drive unit 102, e.g., via fasteners, mechanical connections, magnetic or electromagnetic couplings, or other attachment features. In addition, the upper module 310A may communicate, via wired or wireless connections, to transmit and receive data, instructions, and/or power to and from the control system 104 of the micro drive unit 102. In this manner, the control system 104, e.g., via an upper module controller 214, may receive and transmit data, instructions, and/or power to and from the upper module 310A to perform various operations.

In example embodiments, the micro drive unit 102 may move or navigate to a receiving location associated with an item to be transported. Using the upper module 310A at the receiving location, the micro drive unit 102 may receive an item from a slide, chute, conveyor, platform, table, machine, robot, or other material handling equipment within a facility. Upon receiving the item, the micro drive unit 102 may move or navigate to a destination location associated with the item. Then, using the upper module 310A at the destination location, the micro drive unit 102 may release the item to a slide, chute, conveyor, platform, table, machine, robot, or other material handling equipment within a facility.

FIG. 3B is a schematic, perspective view diagram 300B of an example micro drive unit having a second example upper module, in accordance with implementations of the present disclosure.

As shown in FIG. 3B, the example micro drive unit 102 may include an upper module 310B that comprises a lifting table or platform. For example, the upper module 310B may include a tray, table, platform, or other surface that can move vertically to extend and/or retract relative to the body 103 of the micro drive unit 102. In addition, the upper module 310B may receive, transfer, and release a load, item, or material via the lifting table or platform, and/or the upper module 310B may contact, raise, lower, and release loads, items, materials, pallets, carts, shelves, inventory holders, or other objects via the lifting table or platform. The upper module 310B may include one or more actuators to cause movement of the lifting table or platform, e.g., servos, motors, solenoids, pneumatic cylinders, lead screws, ball screws, scissor lifts, linear actuators, or other types of actuators.

The upper module 310B may be removably or replaceably coupled or attached to an upper portion of the body 103 of the micro drive unit 102, e.g., via fasteners, mechanical connections, magnetic or electromagnetic couplings, or other attachment features. In addition, the upper module 310B may communicate, via wired or wireless connections, to transmit and receive data, instructions, and/or power to and from the control system 104 of the micro drive unit 102. In this manner, the control system 104, e.g., via an upper module controller 214, may receive and transmit data, instructions, and/or power to and from the upper module 310B to perform various operations.

In example embodiments, the micro drive unit 102 may move or navigate to a receiving location associated with an item or object to be transported. Using the upper module 310B at the receiving location, the micro drive unit 102 may receive, engage, or lift an item or object via the lifting platform. Upon receiving the item or object, the micro drive unit 102 may move or navigate to a destination location associated with the item or object. Then, using the upper module 310B at the destination location, the micro drive unit 102 may release, disengage, or lower the item or object via the lifting platform.

In further example embodiments described herein, the micro drive unit 102 may include various other types of upper modules, such as platforms, trays, turntables, robotic arms or manipulators, or other types of modules. In addition, the upper modules may comprise various actuators, such as motors, servos, solenoids, pneumatic cylinders, lead screws, ball screws, scissor lifts, or other types of actuators. Furthermore, the upper modules may be combined in various arrangements or configurations to provide multiple or diverse capabilities to individual micro drive units.

FIG. 4 is a schematic, perspective view diagram 400 of an example arrangement of a plurality of micro drive units to transport a load, in accordance with implementations of the present disclosure.

As shown in FIG. 4, a plurality of micro drive units 102 may be instructed to form a group to receive a load 430 to be transported. For example, based on attributes of the load 430 such as size, dimensions, weight, volume, or other attributes, a number of micro drive units 102 may be instructed to move to a receiving location associated with the load 430.

In addition, a particular arrangement of the micro drive units 102 may also be instructed at the receiving location based on attributes of the load 430. For example, the arrangement of micro drive units 102 may be designated or configured to safely and stably receive and support the load 430 for transport from the receiving location to a destination location. Further, as described herein, some of the micro drive units 102 may have specialized functions or capabilities, such as central control and coordination, power supply and distribution, communication with various control systems, navigational guidance or assistance, load identification and transport, and/or other specialized capabilities. In particular, one or more of the micro drive units 102 may include an upper module comprising a lifting platform, as shown and described at least with respect to FIG. 3B.

The micro drive units 102 may move individually to the receiving location, e.g., independently, in single file, in groups, or in other arrangements or patterns. After the micro drive units 102 move individually to the desired arrangement at the receiving location, the group may receive the load 430, e.g., via automated or robotic machinery or equipment, manual placement by human agents, engaging or lifting of the load by the group from a platform or supports, and/or others. Upon receiving the load 430 by the plurality of micro drive units 102, the group of micro drive units 102 may navigate or move collectively with the load 430 to the destination location. In the example of FIG. 4, the micro drive units 102 may form an arrangement or group that does not leave any gaps or spaces between adjacent micro drive units 102, due to the tileable, combinable, or connectible form factors of the units.

In addition, during transport of the load 430, the plurality of micro drive units 102 may rearrange or recombine in different configurations as needed or desired. For example, one or more micro drive units 102 may disengage and leave the group while other micro drive units 102 continue transporting the load 430. In addition, one or more micro drive units 102 may engage and join the group while other micro drive units 102 are already transporting the load 430. Further, the arrangement and respective positions of individual micro drive units 102 may be adjusted or modified during transport of the load 430.

Upon reaching the destination location, the group of micro drive units 102 may release the load 430, e.g., via automated or robotic machinery or equipment, manual removal by human agents, disengaging or lowering of the load by the group to a platform or supports, and/or others. Then, the group of micro drive units 102 may again move or operate independently of each other. For example, some of the micro drive units 102 may form other different groups and arrangements to perform various other tasks.

In some example embodiments, a group of micro drive units may not physically or mechanically couple to each other when operating as a collective group to transport a load. Instead, the only physical or mechanical coupling may be via the load that is received and transported by the group. In other example embodiments, a group of micro drive units may physically or mechanically couple to each other to form a collective group, e.g., via mechanical hooks, brackets, latches, or similar couplings, via magnetic or electromagnetic connections, or via other types of physical connections. In further example embodiments, a group of micro drive units may establish wireless communication connections with each other during operation as a group, e.g., via wireless network communication devices, via electrical, inductive, or magnetic couplings or connections, or via other data and/or power transfer connections.

FIG. 5 is a schematic, top down view diagram 500 of an example arrangement of a plurality of micro drive units to form a conveyance, in accordance with implementations of the present disclosure.

As shown in FIG. 5, a plurality of micro drive units 102 may be instructed to form a group to form a conveyance, similar to a conveyor or sortation system. For example, based on an origin location, a conveyance path, a destination location, and/or attributes of items or loads to be transported, e.g., size, dimensions, weight, volume, or other attributes, a number of micro drive units 102 may be instructed to form a group that forms a conveyance between the origin location and the destination location.

In addition, a particular arrangement of the micro drive units 102 may also be instructed between the origin location and the destination location. For example, the arrangement of micro drive units 102 may be designated or configured to enable transport of items or loads along a desired conveyance path from the origin location to the destination location. Further, as described herein, some of the micro drive units 102 may have specialized functions or capabilities, such as central control and coordination, power supply and distribution, communication with various control systems, navigational guidance or assistance, load identification and transport, and/or other specialized capabilities. In particular, one or more of the micro drive units 102 may include an upper module comprising a conveyor or sortation section, as shown and described at least with respect to FIG. 3A.

The micro drive units 102 may move individually to positions between the origin location and the destination location, e.g., independently, in single file, in groups, or in other arrangements or patterns. After the micro drive units 102 move individually to the desired arrangement between the origin location and the destination location, the group may begin operation as a conveyance to transfer items or loads along the conveyance path. The individual micro drive units 102 may substantially maintain their individual positions within the collective group during such operations. As a result, the group of micro drive units 102 may form a temporary conveyance to transfer items or loads within a facility, which may operate similar to a conventional fixed conveyance system.

Upon completing operations of transporting items or loads along the conveyance path from the origin location to the destination location, the group of micro drive units 102 may again move or operate independently of each other. For example, some of the micro drive units 102 may form other different groups and arrangements to perform various other tasks.

In some example embodiments, a group of micro drive units 102 may not physically or mechanically couple to each other when operating as a collective group to form a conveyance. Instead, the only physical or mechanical coupling may be via one or more items or loads that are received and transported by the group. In other example embodiments, a group of micro drive units 102 may physically or mechanically couple to each other to form a collective group, e.g., via mechanical hooks, brackets, latches, or similar couplings, via magnetic or electromagnetic connections, or via other types of physical connections. In further example embodiments, a group of micro drive units may establish wireless communication connections with each other during operation as a group, e.g., via wireless network communication devices, via electrical, inductive, or magnetic couplings or connections, or via other data and/or power transfer connections.

FIG. 6 is a flow diagram illustrating an example load transport process 600 using micro drive units, in accordance with implementations of the present disclosure.

The process 600 may begin by receiving data related to a load, as at 602. For example, data related to a load to be transported may comprise various attributes, e.g., size, dimensions, weight, volume, receiving location, destination location, or other attributes. In addition, the data related to the load may be determined based on identification of the load, e.g., by capturing imaging data of the load, scanning identifiers of the load, reading RFID tags of the load, or others. Further, a control system may command or instruct receiving data related to a load to be transported.

The process 600 may continue by determining a number and arrangement of drive units based on the load, as at 604. For example, based on attributes of the load to be transported, a number of micro drive units may be determined, e.g., based on attributes of the micro drive units including location, available power, weight capacity, specialized functions or capabilities, or others. In addition, based on attributes of the load to be transported, an arrangement of micro drive units may be determined, which may also be based on attributes of the micro drive units. The number and arrangement of micro drive units may be determined to form a collective group for transport of the load. Further, a control system may command or instruct determining a number and arrangement of micro drive units to transport a load.

The process 600 may proceed by instructing the drive units to individually move and form the determined arrangement to receive the load, as at 606. For example, identified or selected micro drive units may move individually toward the receiving location associated with the load. At the receiving location, the micro drive units may then form the desired arrangement to receive the load to be transported. Further, a control system may command or instruct the micro drive units to move and form the determined arrangement at the receiving location.

The process 600 may determine whether the drive units are in position, as at 608. For example, it may be determined whether the selected micro drive units have formed the group at the receiving location, and also whether the micro drive units are in position to form the desired arrangement to receive the load. Further, a control system may determine whether the micro drive units are in the desired arrangement.

If the micro drive units have not formed the group in the desired arrangement at the receiving location, the process 600 may return to step 606 to continue to instruct the micro drive units to move and form the determined arrangement.

If, however, the micro drive units have formed the group in the desired arrangement at the receiving location, the process 600 may continue to receive the load by the drive units, as at 610. For example, automated or robotic machinery or equipment may place the load on the group of micro drive units, human agents may at least partially manually place the load on the group of micro drive units, the group of micro drive units may be positioned under the load in order to engage and lift the load from a platform or supports, and/or various other processes may be performed such that the group of micro drive units receive the load. Further, a control system may command or instruct receiving the load by the group of micro drive units.

The process 600 may then proceed to transport the load by the drive units, as at 612. For example, the group of micro drive units may move collectively from the receiving location to a destination location associated with the load. In this manner, the group of micro drive units may transport the load to the destination location. During such transport, one or more specialized micro drive units, as described herein, may perform respective specialized functions or capabilities to facilitate safe and reliable transport of the load. In addition, individual micro drive units that collectively transport a load may have various upper modules to facilitate transport. For example, some micro drive units may include upper modules that comprise conveyor or sortation sections, other micro drive units may include upper modules that comprise lifting platforms and/or turntables, additional micro drive units may include upper modules that comprise trays or platforms, further micro drive units may include upper modules that comprise robotic arms or manipulators, and/or various other micro drive units may comprise other upper modules or combinations thereof. The micro drive units may command, instruct, or control respective upper modules to cause transport of the load to the destination location. Further, a control system may command or instruct transporting the load by the group of micro drive units.

The process 600 may continue with determining whether the group has arrived at the destination, as at 614. For example, it may be determined whether the group of micro drive units has arrived at the destination location with the load, e.g., based on location, navigation, or other data captured or detected by one or more micro drive units, and/or based on data received and processed by a control system that instructs operations of the group of micro drive units. Further, a control system may determine whether the group has arrived at the destination location.

If the group of micro drive units has not arrived at the destination location, the process 600 may return to step 612 to continue to instruct the micro drive units to transport the load to the destination location.

If, however, the group of micro drive units has arrived at the destination location, the process 600 may proceed with unloading the load from the drive units, as at 616. For example, automated or robotic machinery or equipment may remove the load from the group of micro drive units, human agents may at least partially manually remove the load from the group of micro drive units, the group of micro drive units may navigate to a position in order to disengage and lower the load to a platform or supports, and/or various other processes may be performed such that the group of micro drive units unload the transported load at the destination location. Further, a control system may command or instruct unloading the load from the group of micro drive units.

The process 600 may then continue by instructing the drive units to individually move away, as at 618. For example, micro drive units of the group may move individually away from the destination location to which the load was transported. The micro drive units may perform various other tasks or operations, either individually or in other groups and arrangements. Further, a control system may command or instruct the micro drive units to move individually after completing transport of the load as a group.

The process 600 may proceed by determining whether to transport another load, as at 620. For example, it may be determined whether to transport another load using the same or different group of micro drive units. Further, a control system may determine whether to transport another load.

If another load is to be transported using one or more micro drive units, the process 600 may return to step 602 to receive data related to the load to be transported, in order to form a group of micro drive units to perform the transport operation.

If, however, another load is not to be transported using one or more micro drive units, the process 600 may then end, as at 622.

Figure 7:
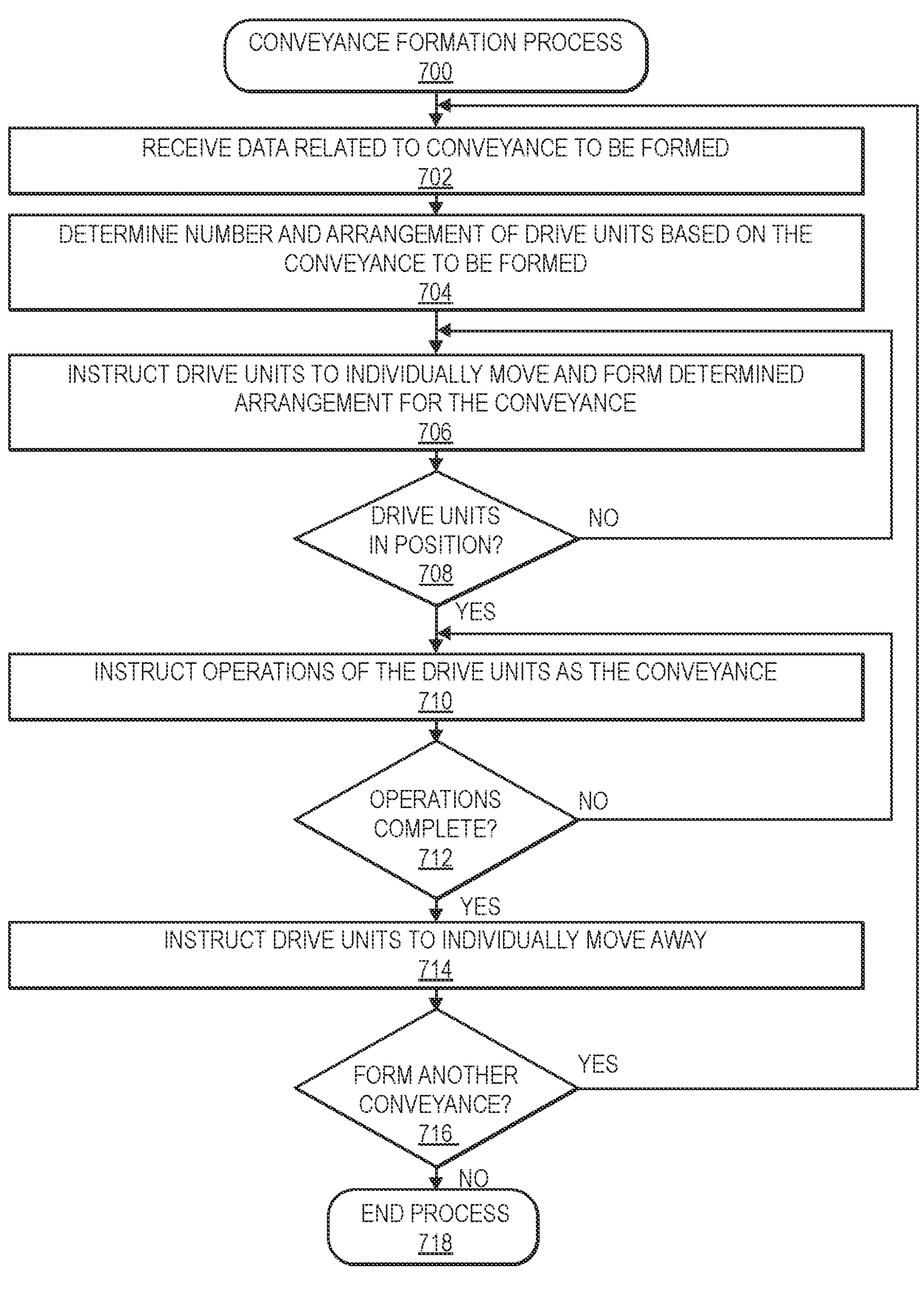
FIG. 7 is a flow diagram illustrating an example conveyance formation process using micro drive units, in accordance with implementations of the present disclosure.

FIG. 7 is a flow diagram illustrating an example conveyance formation process 700 using micro drive units, in accordance with implementations of the present disclosure.

The process 700 may begin by receiving data related to a conveyance to be formed, as at 702. For example, data related to a temporary conveyance to be formed may comprise various attributes, e.g., an origin location, a conveyance path, a destination location, attributes of items or loads to be transported, or other attributes. In addition, the data related to the temporary conveyance may be determined based on identification of loads to be transported, e.g., by capturing imaging data of the loads, scanning identifiers of the loads, reading RFID tags of the loads, or others. Further, a control system may command or instruct receiving data related to a temporary conveyance to be formed.

The process 700 may continue by determining a number and arrangement of drive units based on the conveyance to be formed, as at 704. For example, based on attributes of the temporary conveyance to be formed, a number of micro drive units may be determined, e.g., based on attributes of the micro drive units including location, available power, weight capacity, specialized functions or capabilities, or others. In addition, based on attributes of the temporary conveyance to be formed, such as origin, conveyance path, and/or destination, an arrangement of micro drive units may be determined, which may also be based on attributes of the micro drive units. The number and arrangement of micro drive units may be determined to form a collective group that may form the temporary conveyance. Further, a control system may command or instruct determining a number and arrangement of micro drive units to form a temporary conveyance.

The process 700 may proceed by instructing the drive units to individually move and form the determined arrangement for the conveyance, as at 706. For example, identified or selected micro drive units may move individually toward positions associated with the temporary conveyance to be formed between the origin location and the destination location. Along the conveyance path, the micro drive units may then form the desired arrangement of the temporary conveyance to be formed. Further, a control system may command or instruct the micro drive units to move and form the determined arrangement for the temporary conveyance.

The process 700 may determine whether the drive units are in position, as at 708. For example, it may be determined whether the selected micro drive units have moved to positions along the conveyance path, and also whether the micro drive units are in respective positions to form the desired arrangement of the temporary conveyance. Further, a control system may determine whether the micro drive units are in the desired arrangement.

If the micro drive units have not formed the temporary conveyance in the desired arrangement, the process 700 may return to step 706 to continue to instruct the micro drive units to move and form the determined arrangement.

If, however, the micro drive units have formed the temporary conveyance in the desired arrangement, the process 700 may continue to instruct operations of the drive units as the conveyance, as at 710. During such conveyance, one or more specialized micro drive units, as described herein, may perform respective specialized functions or capabilities to facilitate safe and reliable conveyance of loads. In addition, individual micro drive units that have moved and formed the temporary conveyance may have various upper modules to facilitate transport of loads along the conveyance path. For example, some micro drive units may include upper modules that comprise conveyor or sortation sections, other micro drive units may include upper modules that comprise lifting platforms and/or turntables, additional micro drive units may include upper modules that comprise trays, slides, or chutes, further micro drive units may include upper modules that comprise robotic arms or manipulators, and/or various other micro drive units may comprise other upper modules or combinations thereof. The micro drive units may command, instruct, or control respective upper modules to cause transport of items or loads along the conveyance path of the temporary conveyance. Further, a control system may command or instruct operations of the micro drive units as the temporary conveyance.

The process 700 may proceed to determine whether the operations are complete, as at 712. For example, it may be determined whether the group of micro drive units that has formed the temporary conveyance has completed operations related to transporting items or loads along the conveyance path, e.g., based on data received and processed by a control system that instructs operations of the temporary conveyance. Further, a control system may determine whether the operations of the temporary conveyance are complete.

If the operations of the temporary conveyance are not complete, the process 700 may return to step 710 to continue to instruct operations of the micro drive units as the temporary conveyance to transport items or loads along the conveyance path.

If, however, the operations of the temporary conveyance are complete, the process 700 may then continue with instructing the drive units to individually move away, as at 714. For example, micro drive units of the group may move individually away from respective positions along the conveyance path of the temporary conveyance. The micro drive units may perform various other tasks or operations, either individually or in other groups and arrangements. Further, a control system may command or instruct the micro drive units to move individually after completing operations as a temporary conveyance.

The process 700 may proceed with determining whether to form another conveyance, as at 716. For example, it may be determined whether to form another temporary conveyance using the same or different group of micro drive units. Further, a control system may determine whether to form another temporary conveyance.

If another temporary conveyance is to be formed using one or more micro drive units, the process 700 may return to step 702 to receive data related to the temporary conveyance to be formed, in order to select and arrange a group of micro drive units to perform the transport operation.

If, however, another temporary conveyance is not to be formed using one or more micro drive units, the process 700 may then end, as at 718.

Figure 8:
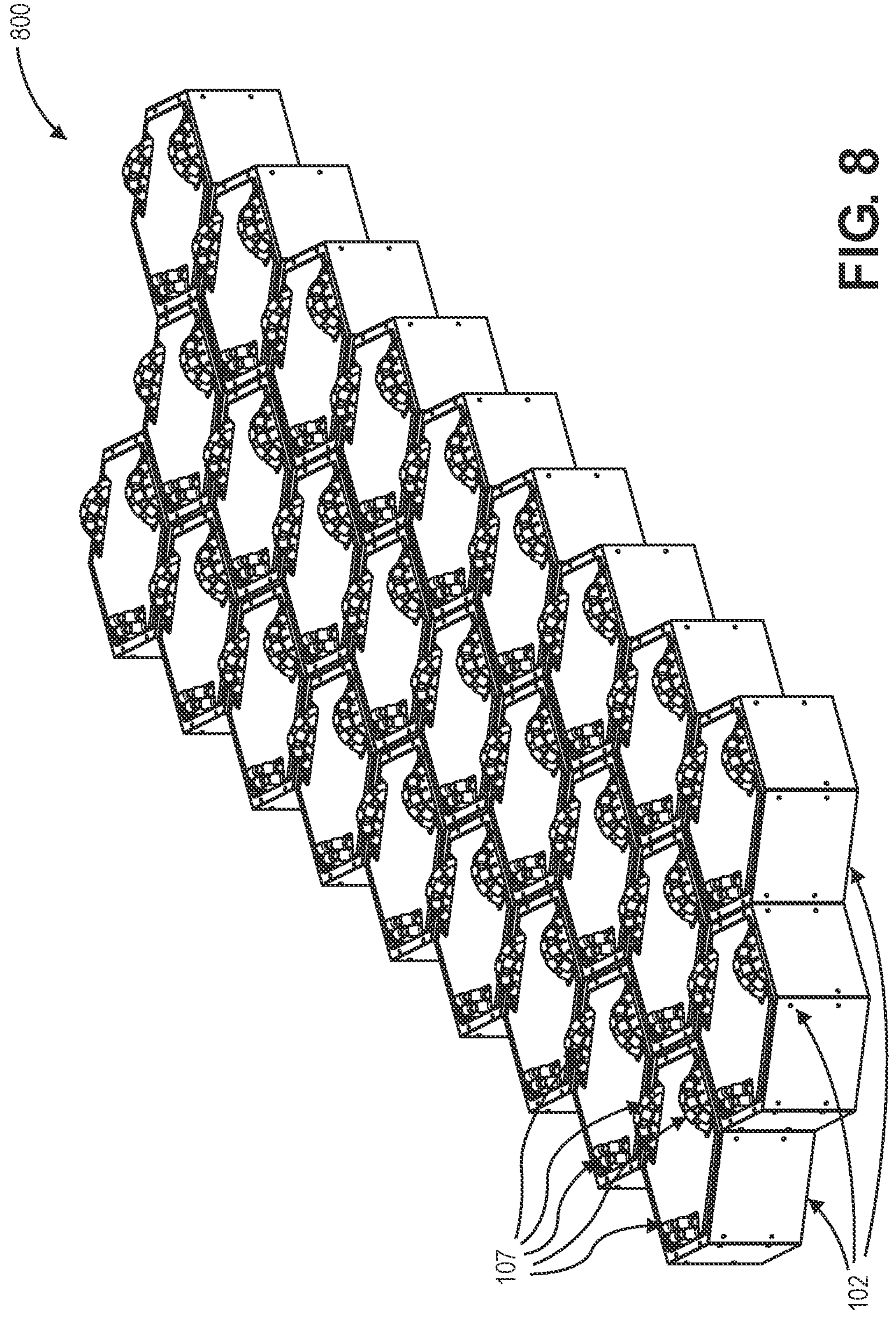
FIG. 8 is a schematic, perspective view diagram of an example arrangement of a plurality of micro drive units to form a motion field, in accordance with implementations of the present disclosure.

FIG. 8 is a schematic, perspective view diagram 800 of an example arrangement of a plurality of micro drive units to form a motion field, in accordance with implementations of the present disclosure.

As shown in FIG. 8, a plurality of micro drive units 102 may be instructed to form a group to form a motion field, similar to a conveyor or sortation system having a plurality of rollers, wheels, or other moving elements on top of and via which items or loads may be transported. For example, based on an origin location, a conveyance path, a destination location, and/or attributes of items or loads to be transported, e.g., size, dimensions, weight, volume, or other attributes, a number of micro drive units 102 may be instructed to form a group that forms a motion field between the origin location and the destination location.

In addition, a particular arrangement of the micro drive units 102 may also be instructed between the origin location and the destination location. For example, the arrangement of micro drive units 102 may be designated or configured to enable transport of items or loads from the origin location to the destination location. Further, as described herein, some of the micro drive units 102 may have specialized functions or capabilities, such as central control and coordination, power supply and distribution, communication with various control systems, load identification and transport, and/or other specialized capabilities. In particular, the micro drive units 102 that form the motion field may include vertical adjustment actuators to cause vertical movement of the drive wheels 107 relative to the body of the micro drive units 102, such that the drive wheels 107 may be positioned to extend from an upper portion of the micro drive units 102 and configured to receive and transport items or loads via operation of the drive wheels 107.

The micro drive units 102 may move individually to positions between the origin location and the destination location, e.g., independently, in single file, in groups, or in other arrangements or patterns. After the micro drive units 102 move individually to the desired arrangement between the origin location and the destination location, the group may reconfigure or adjust drive wheels 107 to be positioned to extend from upper portions of the micro drive units 102, thereby forming a motion field having multiple wheels or rollers to transfer items or loads. The individual micro drive units 102 may substantially maintain their individual positions within the collective group during such operations. As a result, the group of micro drive units 102 may form a temporary motion field to transfer items or loads within a facility, which may operate similar to a conventional fixed conveyance system having a plurality of rollers, wheels, or other moving elements on top of which items or loads may be transported. In the example of FIG. 8, the micro drive units 102 may form an arrangement or group that does not leave any gaps or spaces between adjacent micro drive units 102, due to the tileable, combinable, or connectible form factors of the units.

Upon completing operations of transporting items or loads from the origin location to the destination location, the group of micro drive units 102 may reconfigure or adjust drive wheels 107 to be positioned toward lower portions of the micro drive units, thereby facilitating movement or navigation of individual micro drive units via the drive wheels 107. Then, the micro drive units 102 may again move or operate independently of each other. For example, some of the micro drive units 102 may form other different groups and arrangements to perform various other tasks.

In some example embodiments, a group of micro drive units may not physically or mechanically couple to each other when operating as a collective group to form a motion field. Instead, the only physical or mechanical coupling may be via one or more items or loads that are received and transported by the group. In other example embodiments, a group of micro drive units may physically or mechanically couple to each other to form a collective group, e.g., via mechanical hooks, brackets, latches, or similar couplings, via magnetic or electromagnetic connections, or via other types of physical connections. In further example embodiments, a group of micro drive units may establish wireless communication connections with each other during operation as a group, e.g., via wireless network communication devices, via electrical, inductive, or magnetic couplings or connections, or via other data and/or power transfer connections.

In alternative example embodiments, if the micro drive units 102 do not include vertical adjustment actuators, the micro drive units may be turned upside down, or inverted, to form the motion field in the desired arrangement. The micro drive units 102 may be inverted by various method or processes, e.g., via automated or robotic machinery or equipment that may grasp, manipulate, or invert the micro drive units, human agents that may at least partially manually invert the micro drive units, and/or various other processes to invert the micro drive units to form a motion field.

Figure 9:
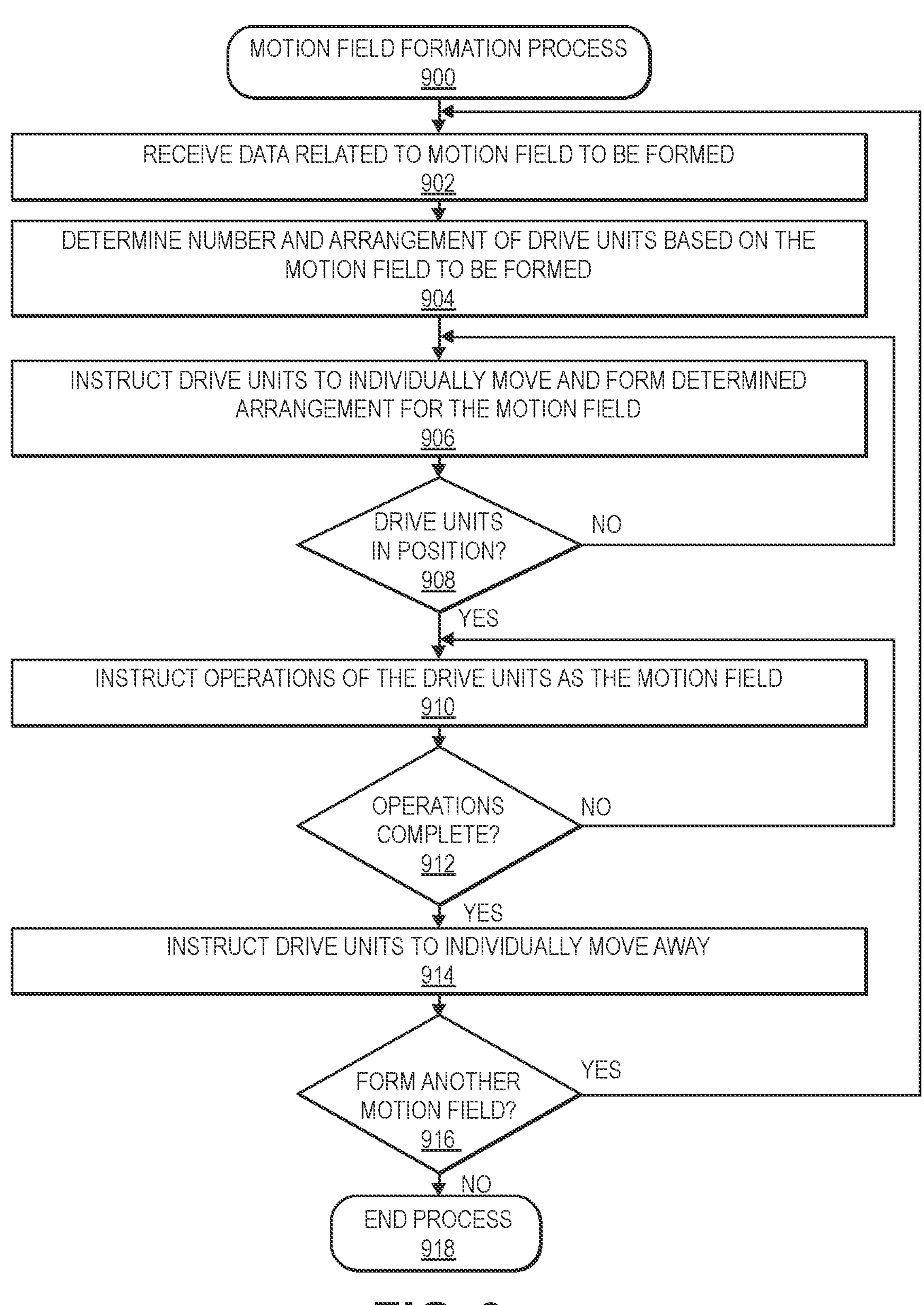
FIG. 9 is a flow diagram illustrating an example motion field formation process using micro drive units, in accordance with implementations of the present disclosure.

FIG. 9 is a flow diagram illustrating an example motion field formation process 900 using micro drive units, in accordance with implementations of the present disclosure.

The process 900 may begin by receiving data related to a motion field to be formed, as at 902. For example, data related to a temporary motion field to be formed may comprise various attributes, e.g., an origin location, a conveyance path, a destination location, attributes of items or loads to be transported, or other attributes. In addition, the data related to the temporary motion field may be determined based on identification of loads to be transported, e.g., by capturing imaging data of the loads, scanning identifiers of the loads, reading RFID tags of the loads, or others. Further, a control system may command or instruct receiving data related to a temporary motion field to be formed.

The process 900 may continue by determining a number and arrangement of drive units based on the motion field to be formed, as at 904. For example, based on attributes of the temporary motion field to be formed, a number of micro drive units may be determined, e.g., based on attributes of the micro drive units including location, available power, weight capacity, specialized functions or capabilities, or others. In addition, based on attributes of the temporary motion field to be formed, such as origin, conveyance path, and/or destination, an arrangement of micro drive units may be determined, which may also be based on attributes of the micro drive units. The number and arrangement of micro drive units may be determined to form a collective group that may form the temporary motion field. Further, a control system may command or instruct determining a number and arrangement of micro drive units to form a temporary motion field.

The process 900 may proceed by instructing the drive units to individually move and form the determined arrangement for the motion field, as at 906. For example, identified or selected micro drive units may move individually toward positions associated with the temporary motion field to be formed between the origin location and the destination location. Along the conveyance path, the micro drive units may then form the desired arrangement of the temporary motion field to be formed, which may also include reconfiguring drive wheels to be positioned to extend from upper portions of the micro drive units via vertical adjustment actuators or by inverting the micro drive units. Further, a control system may command or instruct the micro drive units to move and form the determined arrangement for the temporary motion field.

The process 900 may determine whether the drive units are in position, as at 908. For example, it may be determined whether the selected micro drive units have moved to positions along the conveyance path, and also whether the micro drive units are in respective positions and configurations to form the desired arrangement of the temporary motion field. Further, a control system may determine whether the micro drive units are in the desired arrangement.

If the micro drive units have not formed the temporary motion field in the desired arrangement, the process 900 may return to step 906 to continue to instruct the micro drive units to move and form the determined arrangement.

If, however, the micro drive units have formed the temporary motion field in the desired arrangement, the process 900 may continue to instruct operations of the drive units as the motion field, as at 910. For example, individual micro drive units that have moved and formed the temporary motion field may then actuate one or more drive wheels to facilitate transport of loads along the conveyance path. During such conveyance, one or more specialized micro drive units, as described herein, may perform respective specialized functions or capabilities to facilitate safe and reliable conveyance of loads. The micro drive units may command, instruct, or control respective drive wheels, individually or in combination, to cause transport of items or loads along the conveyance path of the temporary motion field. Further, a control system may command or instruct operations of the micro drive units as the temporary motion field.

The process 900 may proceed to determine whether the operations are complete, as at 912. For example, it may be determined whether the group of micro drive units that has formed the temporary motion field has completed operations related to transporting items or loads along the conveyance path, e.g., based on data received and processed by a control system that instructs operations of the temporary motion field. Further, a control system may determine whether the operations of the temporary motion field are complete.

If the operations of the temporary motion field are not complete, the process 900 may return to step 910 to continue to instruct operations of the micro drive units as the temporary motion field to transport items or loads along the conveyance path.

If, however, the operations of the temporary motion field are complete, the process 900 may then continue with instructing the drive units to individually move away, as at 914. For example, micro drive units of the group may reconfigure respective drive wheels to be positioned toward lower portions of the micro drive units via vertical adjustment actuators or by inverting the micro drive units. Then, the micro drive units may move individually away from respective positions along the conveyance path of the temporary motion field. The micro drive units may perform various other tasks or operations, either individually or in other groups and arrangements. Further, a control system may command or instruct the micro drive units to move individually after completing operations as a temporary motion field.

The process 900 may proceed with determining whether to form another motion field, as at 916. For example, it may be determined whether to form another temporary motion field using the same or different group of micro drive units. Further, a control system may determine whether to form another temporary motion field.

If another temporary motion field is to be formed using one or more micro drive units, the process 900 may return to step 902 to receive data related to the temporary motion field to be formed, in order to select and arrange a group of micro drive units to perform the transport operation.

If, however, another temporary motion field is not to be formed using one or more micro drive units, the process 900 may then end, as at 918.

Figure 10:
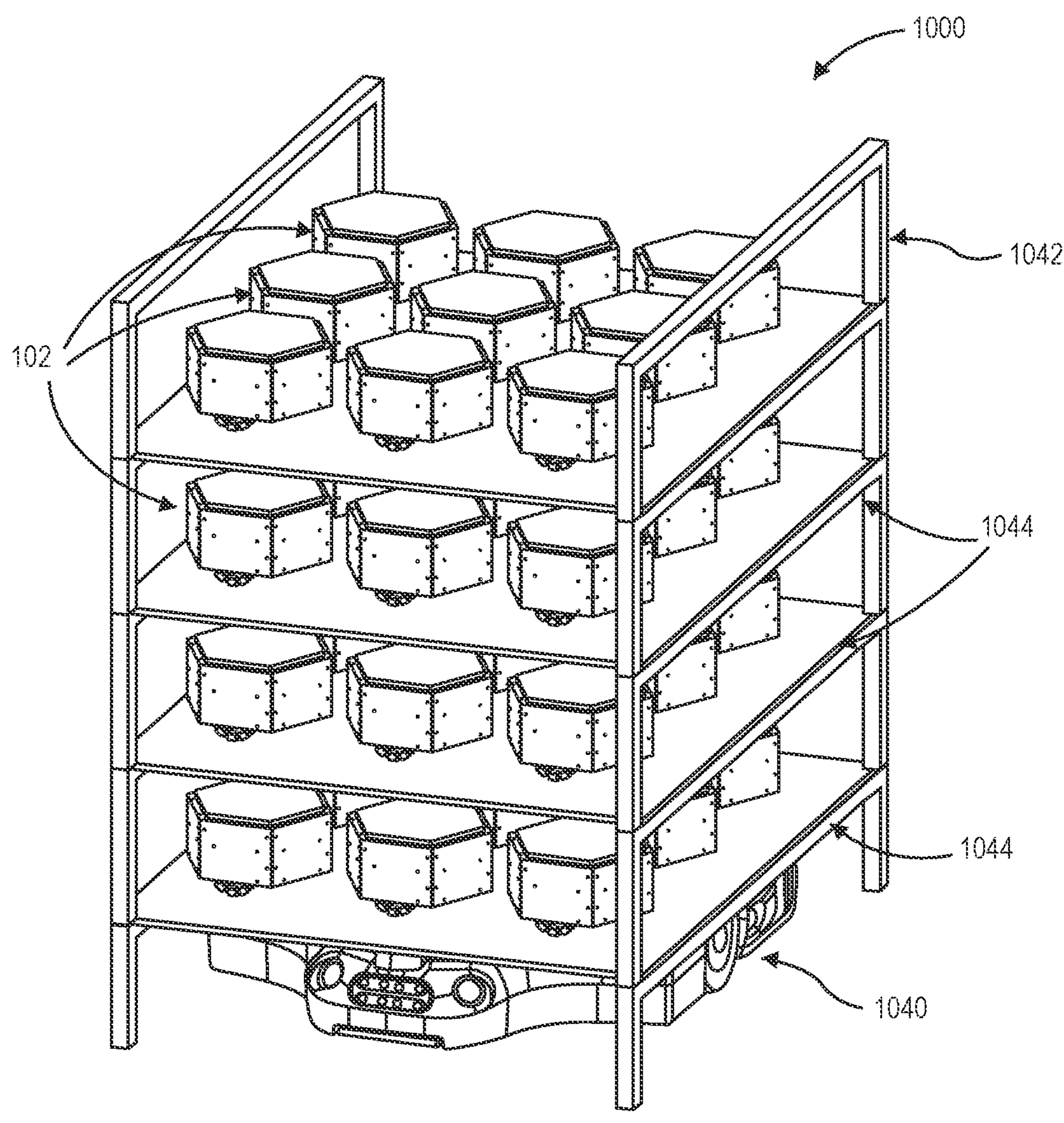
FIG. 10 is a schematic, perspective view diagram of an example arrangement of a plurality of micro drive units for transport and/or charging, in accordance with implementations of the present disclosure.

FIG. 10 is a schematic, perspective view diagram 1000 of an example arrangement of a plurality of micro drive units for transport and/or charging, in accordance with implementations of the present disclosure.

As shown in FIG. 10, a plurality of micro drive units 102 may be received or loaded onto a mobile base station for transport and/or charging of the micro drive units 102. For example, the mobile base station may comprise a robotic drive unit 1040, a frame 1042 that may be engaged, lifted, transported, lowered, and/or disengaged by the robotic drive unit 1040, and a plurality of shelves, levels, or locations 1044 of the frame 1042 that are configured to receive micro drive units 102.

The robotic drive unit 1040 may comprise a relatively larger drive unit that is configured to individually carry heavier items or loads, such as inventory holders, shelves, racks, carts, pallets, gaylords, or other containers that may be loaded with heavy and/or multiple items or loads. The robotic drive unit 1040 may be configured to engage, lift, transport, lower, and/or disengage to and from various loads or items, including the frame 1042 that is configured to receive micro drive units 102.

The frame 1042 and shelves 1044 may be formed or configured to receive a plurality of micro drive units 102 at individual positions of one or more shelves 1044. For example, the frame 1042 may be shaped in a standard square or rectangular configuration of a shelving system having one or more shelves 1044. The frame 1042 and shelves 1044 may be formed of various materials, such as metals, plastics, composites, others, or combinations thereof. In order to receive micro drive units 102 on the different shelves 1044 of the frame 1042, various ramps, chutes, slides, elevators, robotic manipulators, or other conveyance mechanisms may be used to enable movement or navigation of the micro drive units 102 to and from the individual positions of various shelves 1044.

Upon engaging the frame 1042 and shelves 1044, the robotic drive unit 1040 may form one or more mechanical connections or couplings with the frame 1042, in order to lift, transport, and/or lower the frame 1042 and shelves 1044. In addition, the robotic drive unit 1040 may form one or more magnetic, electromagnetic, electrical, inductive, communication, or other connections or couplings with the frame 1042. Further, at individual positions of the shelves 1044, micro drive units 102 may also form one or more mechanical connections or couplings with respective shelves 1044. Moreover, the micro drive units 102 may also form one or more magnetic, electromagnetic, electrical, inductive, communication, or other connections or couplings at individual positions of respective shelves 1044.

Using the various connections or couplings, the robotic drive unit 1040 may be able to establish wired or wireless communication connections with micro drive units 102 that are received on the shelves 1044 of the frame 1042, in order to transmit and/or receive data, instructions, and/or power to and from the micro drive units 102, e.g., sensor data, operational instructions, software or firmware updates, or various other data or information. Various wired or wireless connections may be provided within portions of the frame 1042 and shelves 1044 to enable transfer of data and/or power between the robotic drive unit 1040 and the micro drive units 102.

For example, the robotic drive unit 1040 may form one or more data and/or power connections with a portion of the lowest shelf 1044 of the frame 1042 via physical, mechanical, magnetic, electromagnetic, electrical, inductive, or other contacts or connections, e.g., proximate an underside of the lowest shelf 1044 that the robotic drive unit 1040 engages to lift and/or transport the frame 1042. In addition, micro drive units 102 may form one or more data and/or power connections with portions of respective shelves 1044 of the frame 1042 via physical, mechanical, magnetic, electromagnetic, electrical, inductive, or other contacts or connections, e.g., proximate upper surfaces of respective shelves 1044 at which the micro drive units 102 are positioned. In some examples, micro drive units 102 having vertical adjustment actuators may adjust drive wheels vertically upward and consequently may move an underside of the body of the micro drive units 102 downward toward respective shelves 1044, in order to more reliably form one or more data and/or power connections with portions of the shelves 1044 via physical, mechanical, magnetic, electromagnetic, electrical, inductive, or other contacts or connections.

Upon loading or receiving one or more micro drive units 102 on shelves 1044 of a frame 1042, the robotic drive unit 1040 may transport the micro drive units 102 to one or more locations or areas within a facility, which may be faster and more efficient than instructing a plurality of micro drive units 102 to navigate individually to such locations or areas. Furthermore, while the micro drive units 102 are positioned on the shelves 1044 of the frame 1042 and/or during transport of the micro drive units 102 by the robotic drive unit 1040, one or more micro drive units 102 may receive power from power supplies of the robotic drive unit 1040 to recharge respective power supplies of the micro drive units 102. In addition, power may also be distributed or shared among the micro drive units 102 that are positioned on the shelves 1044 of the frame 1042, in order to recharge power supplies of one or more of the micro drive units 102. Alternatively, one or more power supplies may be associated with the frame 1042 and/or shelves 1044 to provide power for recharging or distribution of power among the micro drive units 102 loaded onto shelves 1044 of the frame 1042.

In alternative example embodiments, instead of using a larger robotic drive unit 1040 to transport the frame 1042 and shelves 1044 loaded with one or more micro drive units 102, a plurality of micro drive units may form a collective group and perform operations similar to the larger robotic drive unit 1040. In this manner, a group of micro drive units may be selected and arranged to engage and transport the frame 1042 and shelves 1044, similar to the description of at least FIGS. 4 and 6. In addition, the group of micro drive units that engages, lifts, transports, lowers, and/or disengages the frame 1042 and shelves 1044 may also form data and/or power connections with micro drive units 102 that are loaded onto the shelves 1044, in order to transmit and/or receive data, instructions, and/or power to and from the micro drive units 102.

Figure 11:
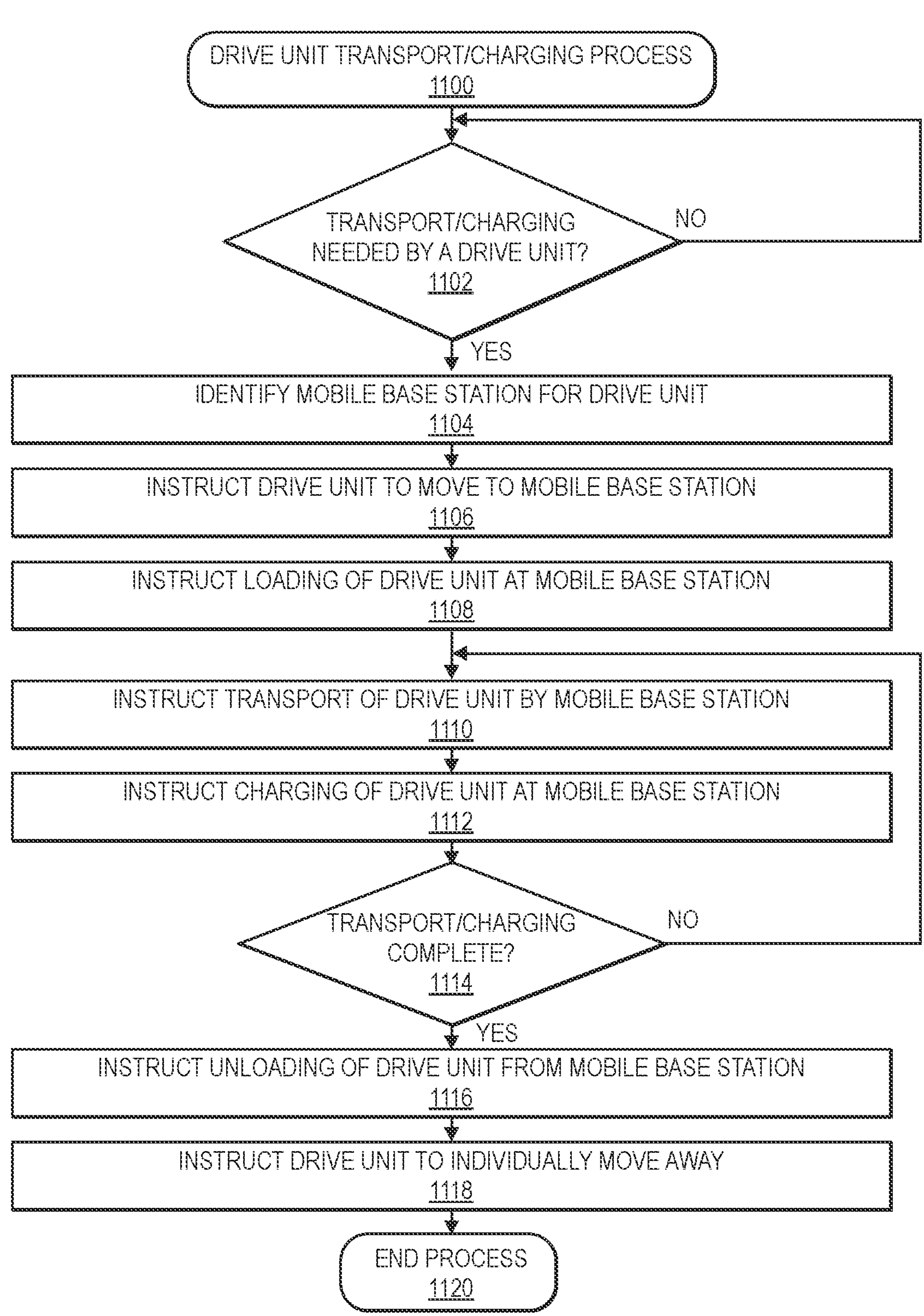
FIG. 11 is a flow diagram illustrating an example micro drive unit transport/charging process, in accordance with implementations of the present disclosure.

FIG. 11 is a flow diagram illustrating an example micro drive unit transport/charging process 1100, in accordance with implementations of the present disclosure.

The process 1100 may begin by determining whether transport and/or charging is needed by a drive unit, as at 1102. For example, it may be determined whether one or more micro drive units should be transported and/or charged to perform various tasks, operations, or processes. The micro drive units may be needed in a particular location or area of a facility for various operations, and/or power supplies of the micro drive units may need to be recharged for various operations. In addition, data may need to be shared and/or software or firmware updates may need to be provided to micro drive units. Thus, micro drive units may communicate with and/or send requests to a control system when transport and/or charging is needed by the micro drive units, e.g., based on current location, desired location, assigned operations, remaining state of charge, or other attributes of the micro drive units. Further, a control system may determine whether transport and/or charging is needed by a drive unit.

If it is determined that transport and/or charging is not needed by a micro drive unit, the process 1100 may return to step 1102 until it is determined that transport and/or charging is needed by one or more micro drive units.

If, however, it is determined that transport and/or charging is needed by a micro drive unit, the process 1100 may continue by identifying a mobile base station for the drive unit, as at 1104. For example, a mobile base station may comprise a robotic drive unit or a group of micro drive units, and a frame, rack, shelves, or other structure having a plurality of positions to receive or load micro drive units. A particular mobile base station may be selected from a plurality of mobile base stations within a facility based on various attributes, e.g., current location, availability, remaining power supply, carrying capacity, assigned operations or destinations, currently loaded micro drive units, or other attributes. Further, a control system may command or instruct identifying a mobile base station for one or more micro drive units.

The process 1100 may proceed by instructing the drive unit to move to a mobile base station, as at 1106. For example, based on a selected mobile base station, the micro drive unit may be instructed to move or navigate toward a position of the mobile base station. In addition or alternatively, the mobile base station may also be instructed to move toward a current position of the micro drive unit. Furthermore, each of the micro drive unit and the mobile base station may be instructed to move toward a rendezvous or meeting location. Further, a control system may command or instruct movement of the drive unit toward the mobile base station.

The process 1100 may continue to instruct loading of the drive unit at the mobile base station, as at 1108. For example, the micro drive unit may be received or loaded onto a portion of the mobile base station, e.g., a shelf or other position of a frame, rack, or structure. In some examples, one or more ramps, chutes, slides, elevators, robotic manipulators, or other conveyance mechanisms may be used or instructed to load the micro drive unit onto the mobile base station. In addition, the micro drive unit may make various physical, mechanical, magnetic, electromagnetic, electrical, inductive, or other contacts or connections with portions of the frame, rack, or structure upon or during loading onto the mobile base station, via which the micro drive unit may establish data and/or power transfer connections with other micro drive units loaded onto the mobile base station and/or a robotic drive unit or group of drive units that move the mobile base station. Further, a control system may command or instruct loading of the micro drive unit at the mobile base station.

The process 1100 may proceed to instruct transport of the drive unit by the mobile base station, as at 1110. For example, a robotic drive unit or group of micro drive units may engage and transport the mobile base station between locations of a facility. In addition, the micro drive unit may be transported by the mobile base station to a desired or destination location, while other micro drive units may be transported by the mobile base station to other respective destination locations. Further, a control system may command or instruct transport of the micro drive unit by the mobile base station.

The process 1100 may then continue with instructing charging of the drive unit by the mobile base station, as at 1112. For example, while loaded onto the mobile base station, a power supply of the micro drive unit may be recharged, e.g., by a power supply of the robotic drive unit or power supplies of a group of micro drive units that engage and transport the mobile base station. Alternatively, one or more power supplies may be associated with the frame, rack, or structure to provide power for recharging or distribution of power among the micro drive units loaded onto the mobile base station. In addition, various data may be transmitted to or shared among the micro drive units, including software or firmware updates or other data. Further, a control system may command or instruct charging of the micro drive unit by the mobile base station.

The process 1100 may then determine whether transport and/or charging is complete, as at 1114. For example, it may be determined whether the mobile base station has arrived at a destination location for the micro drive unit, whether a power supply of the micro drive unit is sufficiently recharged, e.g., to a level sufficient to perform various operations at the destination location, and/or whether data sharing or updates are complete. Further, a control system may determine whether transport and/or charging of the micro drive unit is complete or sufficient.

If it is determined that the transport and/or charging is not complete, the process 1100 may return to step 1110 to continue transport and/or charging of the micro drive unit by the mobile base station.

If, however, it is determined that the transport and/or charging is complete, the process 1100 may proceed with instructing unloading of the drive unit from the mobile base station, as at 1116. For example, the micro drive unit may be unloaded from the portion of the mobile base station, e.g., a shelf or other position of a frame, rack, or structure. In some examples, one or more ramps, chutes, slides, elevators, robotic manipulators, or other conveyance mechanisms may be used or instructed to unload the micro drive unit from the mobile base station. In addition, the micro drive unit may disconnect various physical, mechanical, magnetic, electromagnetic, electrical, inductive, or other contacts or connections with portions of the frame, rack, or structure upon or during unloading from the mobile base station. Further, a control system may command or instruct unloading of the micro drive unit from the mobile base station.

The process 1100 may then continue by instructing the drive unit to individually move away, as at 1118. For example, upon unloading from the mobile base station, the micro drive unit may move individually away from the mobile base station at the destination location. Then, the micro drive unit may perform various other tasks or operations, either individually or in other groups and arrangements. Further, a control system may command or instruct the micro drive unit to move individually after unloading from the mobile base station.

The process 1100 may then end, as at 1120.

Figure 12:
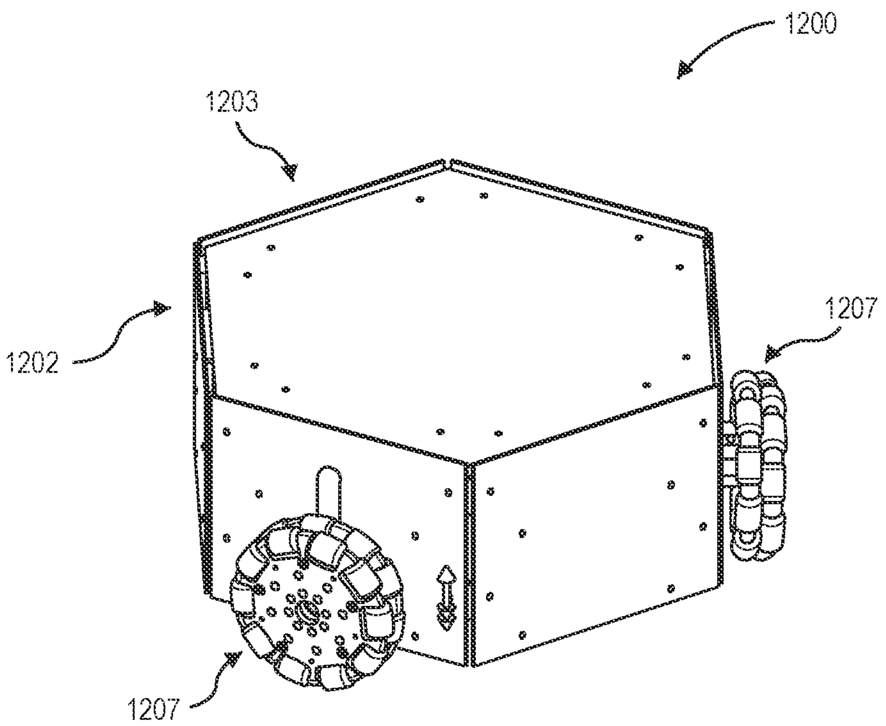
FIG. 12 is a schematic, perspective view diagram of another example micro drive unit, in accordance with implementations of the present disclosure.
Figure 13:
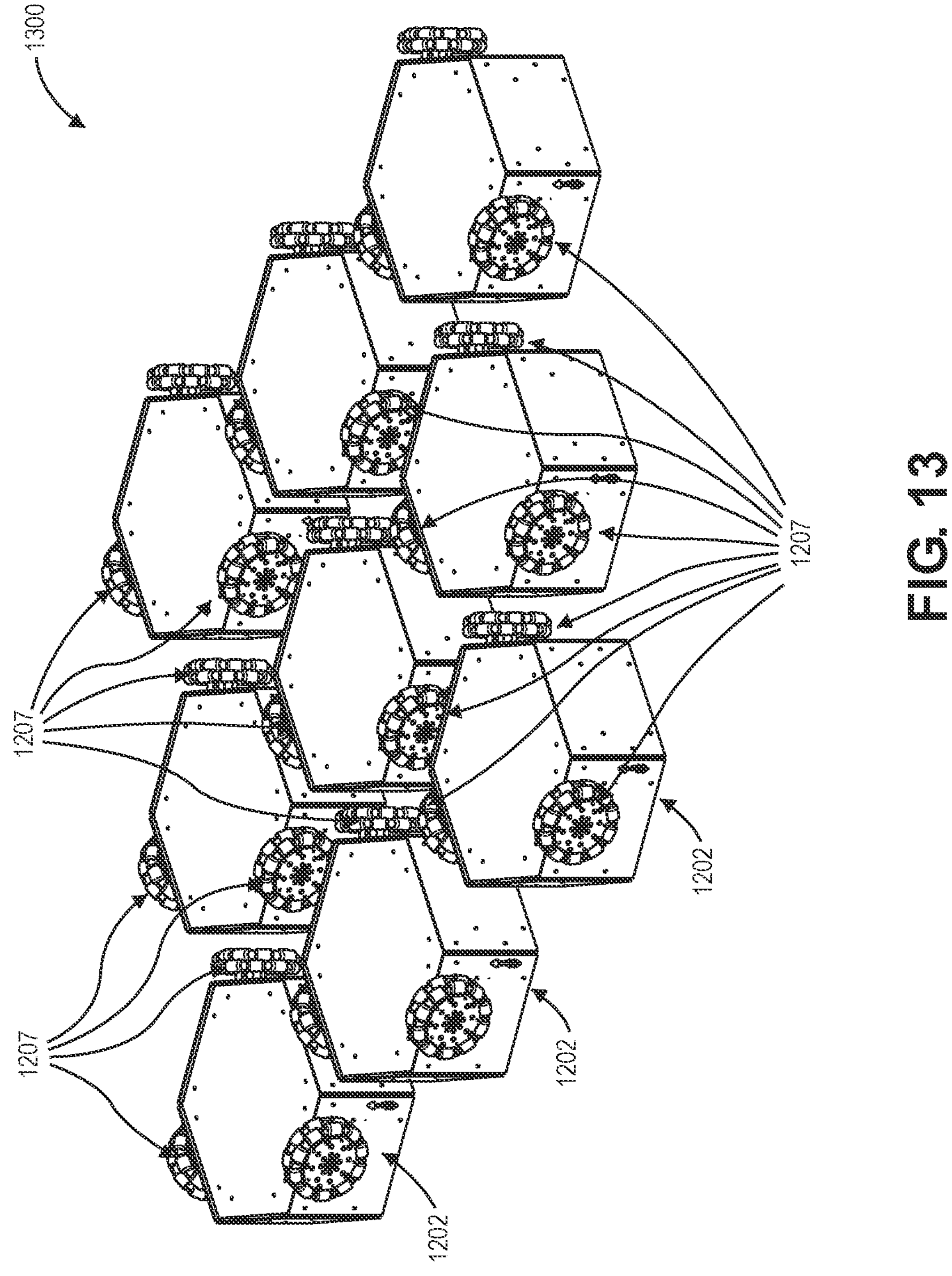
FIG. 13 is a schematic, perspective view diagram of an example arrangement of a plurality of the example micro drive units of FIG. 12 to form a motion field, in accordance with implementations of the present disclosure.

FIG. 12 is a schematic, perspective view diagram 1200 of another example micro drive unit, in accordance with implementations of the present disclosure, and FIG. 13 is a schematic, perspective view diagram 1300 of an example arrangement of a plurality of the example micro drive units of FIG. 12 to form a motion field, in accordance with implementations of the present disclosure.

As shown in FIG. 12, the example micro drive unit 1202 may comprise a body, frame, or structure 1203 that receives, houses, or encloses various components described herein. For example, the micro drive unit 1202 may include any and all of the features of the micro drive unit 102 described herein at least with respect to FIGS. 1, 2, 3A, and 3B, such as a control system, a plurality of drive motors operatively connected to a plurality of drive wheels 1207, one or more vertical adjustment actuators, one or more upper modules and associated actuators, and one or more sensors.

In addition, as described herein at least with respect to FIGS. 1, 2, 3A, and 3B, the micro drive unit 1202 may also include various other components, actuators, sensors, or signaling devices, such as cameras, scanners, lights, displays, other visual input/output devices, microphones, speakers, other audio input/output devices, servos, solenoids, motors, or actuators to perform various aspects of material transport operations. Further, the micro drive unit 1202 may also include location sensors, inertial measurement units, accelerometers, gyroscopes, magnetometers, odometers, speedometers, encoders, weight, pressure, or contact sensors, proximity sensors, radiofrequency identification (RFID) readers, radar, LIDAR (light detection and ranging), or other range detection sensors, or other components, actuators, or sensors.

Moreover, as described herein at least with respect to FIGS. 4-11, the micro drive unit 1202 may perform any and all of the tasks, operations, or processes described herein, such as transporting loads individually, transporting loads collectively in groups, forming temporary conveyances, forming temporary motion fields, loading onto and unloading from mobile base stations that may provide transport and/or charging, and/or various other operations described herein.

As illustrated in FIG. 12, the body 1203 of the micro drive unit 1202 may comprise a shape or form factor that can be arranged into one or more formations with other micro drive units while leaving or forming small or minimal gaps between adjacent units. One example shape or form factor may comprise a substantially hexagonal shape or form factor, e.g., a regular hexagonal prism. The body 1203 may be formed of one or more plates, brackets, or surfaces that are coupled or connected together, e.g., via fasteners, adhesives, welding, or other joining or attachment methods. In some examples, the micro drive unit 1202 may have dimensions and a cargo or weight carrying capacity similar to the dimensions and cargo carrying capacity of the example micro drive unit of FIG. 1. The body 1203 may also be formed of various materials, such as metals, plastics, composites, others, or combinations thereof. For the example micro drive unit 1202 of FIG. 12, the plurality of drive wheels 1207 may extend to an exterior of the body 1203, e.g., via slots or holes of the body 1203, and may be operatively connected to the plurality of drive motors that are positioned within an interior of the body 1203.

The example micro drive unit 1202 may comprise three sets of drive wheels 1207. The three sets of drive wheels 1207 may be positioned approximately 120 degrees around a center of the body 1203 relative to each other. Each set of drive wheels 1207 may be operatively connected to and rotated by a respective drive motor, such that the example micro drive unit 1202 may comprise three drive motors that are each operatively coupled to rotate or drive respective sets of the drive wheels 1207. The drive motors may comprise various types of actuators, such as servo motors, rotary actuators, hub motors, or other types of actuators, which may be coupled directly or indirectly to respective drive wheels 1207 via drive shafts, transmissions, or other drivetrains. The sets of drive wheels 1207 may be formed of various materials, such as metals, plastics, composites, rubber, silicone, others, or combinations thereof.

As shown in FIG. 12, the drive wheels 1207 may comprise omnidirectional wheels, or omni wheels, similar to the omnidirectional wheels described herein at least with respect to FIGS. 1, 2, 3A, and 3B. In addition, as shown in FIG. 12, each set of drive wheels 1207 may comprise two or more omnidirectional wheels that have an angular offset around the rotational axes of the main wheels relative to each other. The angular offset may be defined such that in any rotational position of a single set of drive wheels 1207, at least one smaller roller positioned at the outer periphery of at least one of the main wheels may be in contact with a surface or floor on which the single set of drive wheels 1207 is positioned and/or moving.

Using the three sets of drive wheels 1207 that are independently driven by respective drive motors and controllers, the micro drive unit 1202 may move in substantially any direction on a surface or floor on which the micro drive unit 1202 is positioned. Because each of the three sets of drive wheels 1207 are offset 120 degrees around the center of the body 1203 of the micro drive unit 1202, the rotational axes of the three sets of drive wheels 1207 are also offset approximately 120 degrees relative to each other around the center of the body 1203. As a result, by independent and/or combined rotation of the three sets of drive wheels 1207 using respective drive motors, the micro drive unit 1202 may be substantially omnidirectional relative to a surface or floor on which the micro drive unit 1202 is positioned.

Further, although the three sets of drive wheels 1207 can enable movement in substantially any direction on a surface or floor without requiring turning or rotation of the micro drive unit 1202 to move in any specific direction, the three sets of drive wheels 1207 can also cause turning or rotation of the micro drive unit 1202 as a whole, e.g., rotation around a center of the body 1203 of the micro drive unit 1202, or rotation while moving in a specific direction. Such turning or rotation of a micro drive unit 1202 may be desired, for example, if a load is to be received in a particular orientation by the micro drive unit 1202 from an upstream system or process, if a load is to be transferred or released in particular orientation from the micro drive unit 1202 to a downstream system or process, during transport of a load through a facility, and/or for various other reasons.

As described herein at least with respect to FIGS. 1 and 2, the micro drive unit 1202 may also include one or more vertical adjustment actuators. For example, the vertical adjustment actuators may enable movement of the drive wheels 1207 and the body 1203 in a vertical direction relative to each other. The vertical adjustment actuators may comprise various actuators, such as motors, servos, solenoids, pneumatic cylinders, lead screws, ball screws, scissor lifts, or other types of actuators. In addition, the vertical adjustment actuators may be operatively coupled between the body 1203 and the drive wheels 1207 and/or drive motors, in order to cause vertical movement of the drive wheels 1207 relative to the body 1203. As illustrated in FIG. 12, the slots associated with the body 1203 may enable vertical movement of the drive wheels 1207 and associated drive shafts, transmissions, or drivetrains relative to the body 1203. Although only one slot is shown in FIG. 12, it is understood that each of the drive wheels 1207 and associated drive motors may be operatively connected via similar slots of the body 1203 to enable vertical movement or adjustment thereof.

In some examples, the vertical adjustment actuators may cause movement of the drive wheels 1207 relative to the body 1203 to raise or lower a vertical height of the body 1203 relative to a surface or floor on which the micro drive unit 1202 is operating. In addition, vertical adjustment of the height of the body 1203 of the micro drive unit 1202 may enable raising and/or lowering of loads, items, or other materials received by or in contact with an upper surface of the micro drive unit 1202. Further details of an example load transport using micro drive units are described herein at least with respect to FIGS. 4-7.

In other examples, the vertical adjustment actuators may cause movement of the drive wheels 1207 relative to the body 1203 such that the drive wheels 1207 may be positioned substantially toward an upper portion of the body 1203. Such vertical adjustment of the drive wheels 1207 of the micro drive unit 1202 to be positioned toward an upper portion of the body 1203 may enable operation of one or more micro drive units 1202 as a motion field, which may be configured to transport various loads, items, or materials via operations of the drive motors and drive wheels 1207. Further details of an example motion field using micro drive units are described herein at least with respect to FIGS. 8, 9, and 13.

As further described herein at least with respect to FIGS. 1, 2, 3A, and 3B, the micro drive unit 1202 may also include one or more upper modules and associated actuators. For example, the upper modules may comprise platforms, trays, conveyor sections, turntables, robotic arms or manipulators, lifting tables or platforms, or other types of modules. The upper modules may comprise various actuators, such as motors, servos, solenoids, pneumatic cylinders, lead screws, ball screws, scissor lifts, or other types of actuators. In addition, the upper modules may be removably or replaceably coupled or attached to an upper portion of the body 1203 of the micro drive unit 1202, and the upper modules may communicate, via wired or wireless connections, to transmit and receive data, instructions, and/or power to and from the control system of the micro drive unit 1202.

Moreover, as shown in FIG. 13, a group of micro drive units 1202 may move to respective positions of a desired arrangement to form a temporary motion field. In addition, the micro drive units 1202 may reconfigure themselves to a motion field configuration by adjusting vertical positions of drive wheels 1207 to be positioned substantially toward upper portions of the bodies 1203 of the micro drive units 1202. Because the drive wheels 1207 of the micro drive units 1202 are positioned outside of an outer periphery of the body 1203 of the micro drive units 1202, the group of micro drive units 1202 may be positioned adjacent to each other in the motion field configuration of FIG. 13 to form an upper surface having small or minimal gaps between adjacent drive units, upon which one or more items, loads, or materials may be received, loaded, and/or transported.

In other example embodiments, the micro drive units may have other sizes, shapes, or form factors, such as triangular, square, rectangular, circular, oval, or other regular, irregular, tileable, combinable, and/or connectible shapes or form factors. In addition, the micro drive units may have other numbers, sets, or arrangements of drive wheels and drive motors. Moreover, the drive wheels may comprise various other types of wheels, such as standard wheels, mecanum wheels, omnidirectional wheels, caster wheels, or combinations thereof. Further, the drive wheels may be independently or collectively driven by one or more drive motors, and may have various configurations, such as differential drive configurations, front wheel, rear wheel, or all-wheel drive configurations, steerable wheel configurations, or other configurations or combinations thereof.

The various example micro drive units described herein may be relatively simple, small, lightweight, safe, fast, and efficient. Further, the micro drive units may enable flexible and adaptive performance of various material transport operations, including individual load transport, collective load transport, temporary conveyance formation, temporary motion field formation, or others. Moreover, by generating or forming a diverse group of specialized micro drive units that have different respective capabilities, the micro drive units may be individually designed or configured as simple, safe, small, fast, and lightweight units, while also collectively providing a diverse and distributed range of capabilities that may be aggregated in various arrangements or combinations as desired to perform particular tasks, processes, or operations.

Figure 14:
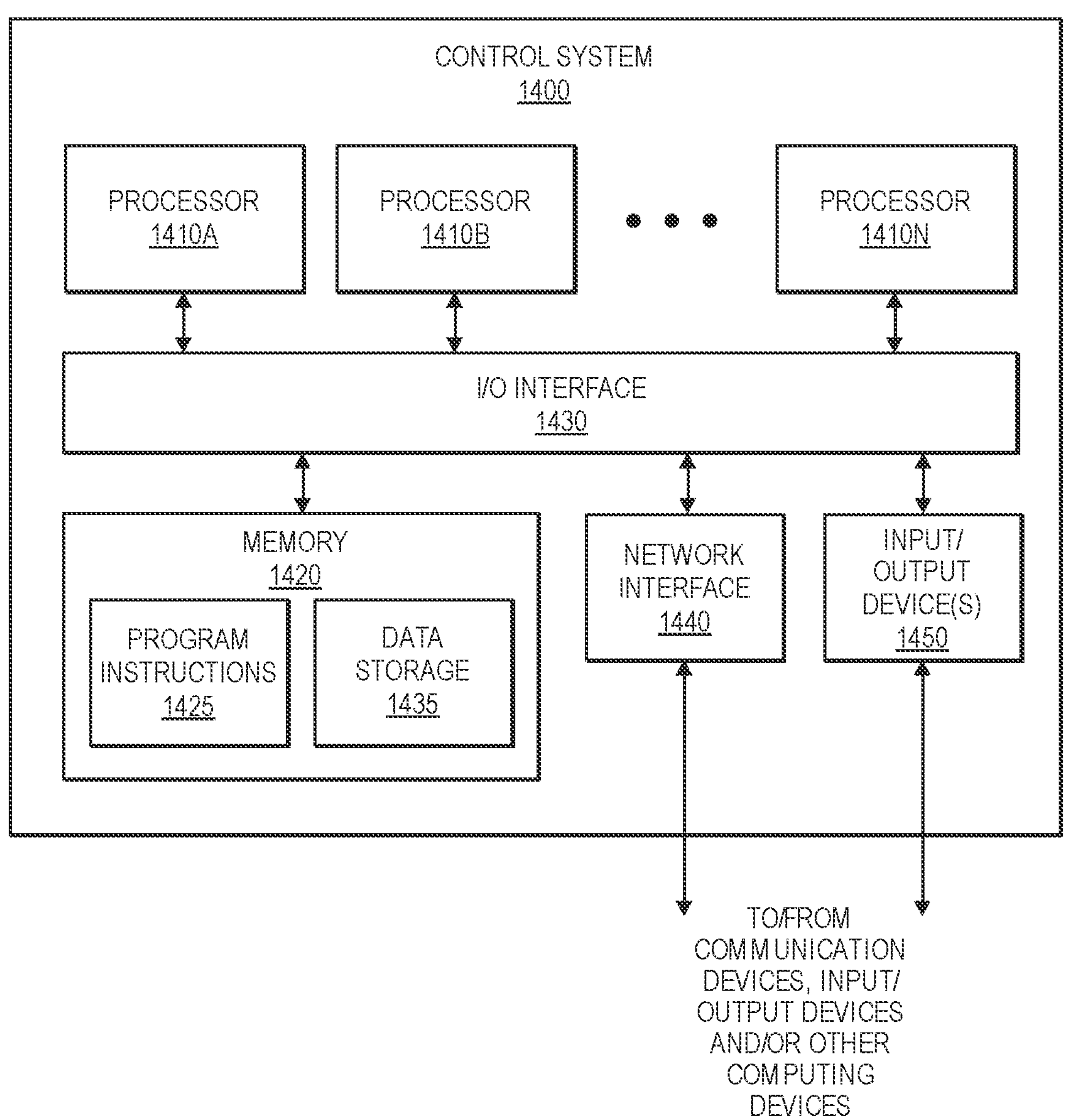
FIG. 14 is a block diagram illustrating various components of an example control system, in accordance with implementations of the present disclosure.

FIG. 14 is a block diagram illustrating various components of an example control system 1400, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. In the illustrated implementation, a control system 1400 includes one or more processors 1410A, 1410B through 1410N, coupled to a non-transitory computer-readable storage medium 1420 via an input/output (I/O) interface 1430. The control system 1400 further includes a network interface 1440 coupled to the I/O interface 1430, and one or more input/output devices 1450. In some implementations, it is contemplated that a described implementation may be implemented using a single instance of the control system 1400 while, in other implementations, multiple such systems or multiple nodes making up the control system 1400 may be configured to host different portions or instances of the described implementations. For example, in one implementation, some data sources or services (e.g., related to portions of micro drive unit systems, operations, or processes, etc.) may be implemented via one or more nodes of the control system 1400 that are distinct from those nodes implementing other data sources or services (e.g., related to other portions of micro drive unit systems, operations, or processes, etc.).

In various implementations, the control system 1400 may be a uniprocessor system including one processor 1410A, or a multiprocessor system including several processors 1410A-1410N (e.g., two, four, eight, or another suitable number). The processors 1410A-1410N may be any suitable processor capable of executing instructions. For example, in various implementations, the processors 1410A-1410N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1410A-1410N may commonly, but not necessarily, implement the same ISA.

The non-transitory computer-readable storage medium 1420 may be configured to store executable instructions and/or data accessible by the one or more processors 1410A-1410N. In various implementations, the non-transitory computer-readable storage medium 1420 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1420 as program instructions 1425 and data storage 1435, respectively. In other implementations, program instructions and/or data may be received, sent or stored upon different types of computer-accessible media, such as non-transitory media, or on similar media separate from the non-transitory computer-readable storage medium 1420 or the control system 1400. Generally speaking, a non-transitory, computer-readable storage medium may include storage media or memory media such as magnetic or optical media, e.g., disk or CD/DVD-ROM, coupled to the control system 1400 via the I/O interface 1430. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1440.

In one implementation, the I/O interface 1430 may be configured to coordinate I/O traffic between the processors 1410A-1410N, the non-transitory computer-readable storage medium 1420, and any peripheral devices, including the network interface 1440 or other peripheral interfaces, such as input/output devices 1450. In some implementations, the I/O interface 1430 may perform any necessary protocol, timing or other data transformations to convert data signals from one component (e.g., non-transitory computer-readable storage medium 1420) into a format suitable for use by another component (e.g., processors 1410A-1410N). In some implementations, the I/O interface 1430 may include support for devices attached through various types of peripheral buses, such as a variant of the Peripheral Component Interconnect (PCI) bus standard or the Universal Serial Bus (USB) standard, for example. In some implementations, the function of the I/O interface 1430 may be split into two or more separate components, such as a north bridge and a south bridge, for example. Also, in some implementations, some or all of the functionality of the I/O interface 1430, such as an interface to the non-transitory computer-readable storage medium 1420, may be incorporated directly into the processors 1410A-1410N.

The network interface 1440 may be configured to allow data to be exchanged between the control system 1400 and other devices attached to a network, such as other control systems, material handling system controllers, warehouse management systems, other computer systems, automated or robotic equipment, machines, or systems, micro drive unit control systems, various types of sensors, various types of vision systems, imaging devices, or imaging sensors, upstream stations or processes, downstream stations or processes, other material handling systems or equipment, or between nodes of the control system 1400. In various implementations, the network interface 1440 may support communication via wired or wireless general data networks, such as any suitable type of Ethernet network.

Input/output devices 1450 may, in some implementations, include one or more displays, monitors, projection devices, touchscreens, imaging devices, scanning devices, other visual input/output devices, speakers, microphones, other audio input/output devices, keyboards, keypads, touchpads, sensors, photo eyes, proximity sensors, RFID readers, voice or optical recognition devices, or any other devices suitable for entering or retrieving data by one or more control systems 1400. Multiple input/output devices 1450 may be present in the control system 1400 or may be distributed on various nodes of the control system 1400. In some implementations, similar input/output devices may be separate from the control system 1400 and may interact with one or more nodes of the control system 1400 through a wired or wireless connection, such as over the network interface 1440.

As shown in FIG. 14, the memory 1420 may include program instructions 1425 that may be configured to implement one or more of the described implementations and/or provide data storage 1435, which may comprise various tables, data stores and/or other data structures accessible by the program instructions 1425. The program instructions 1425 may include various executable instructions, programs, or applications to facilitate micro drive unit operations and processes described herein, such as micro drive unit controllers, drivers, or applications, automated or robotic equipment, machine, or apparatus controllers, drivers, or applications, mobile base station controllers, drivers, or applications, actuator controllers, drivers, or applications, sensor controllers, drivers, or applications, sensor data processing applications, vision system or imaging device controllers, drivers, or applications, imaging data processing applications, material handling equipment controllers, drivers, or applications, upstream station controllers, drivers, or applications, downstream station controllers, drivers, or applications, etc. The data storage 1435 may include various data stores for maintaining data related to systems, operations, or processes described herein, such as micro drive units, groups of micro drive units, loads, items, or materials, temporary conveyance, temporary motion fields, receiving locations, origin locations, destination locations, conveyance paths, mobile base stations, automated or robotic equipment, machines, or apparatus, actuators, sensors, sensor data, vision systems or imaging devices, imaging data, material handling equipment or apparatus, upstream systems, stations, or processes, downstream systems, stations, or processes, etc.

Those skilled in the art will appreciate that the control system 1400 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 1400 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 6, 7, 9, and 11, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A micro drive unit, comprising:

a frame having a hexagonal shape;

three sets of drive wheels positioned around the frame, individual sets of the drive wheels comprising pairs of omnidirectional wheels;

a vertical adjustment actuator configured to adjust a vertical position of the three sets of drive wheels relative to the frame; and a control system having a processor and a memory, the control system configured to at least:

instruct adjustment, via the vertical adjustment actuator, of the three sets of drive wheels between a first position at least partially extending from a lower surface of the frame and a second position at least partially extending from an upper surface of the frame;

wherein responsive to the three sets of drive wheels being in the first position, instruct the micro drive unit to receive and transport a first load via movement using the three sets of drive wheels within a material handling facility; and wherein responsive to the three sets of drive wheels being in the second position, instruct the micro drive unit to receive and transport a second load via actuation of the three sets of drive wheels.

2. The micro drive unit of claim 1, further comprising at least one of a mesh networking device, a short range communication device, a power supply, an imaging sensor, a navigation sensor, a signaling device, or a time of flight sensor.

3. The micro drive unit of claim 1, wherein the control system is further configured to:

instruct the micro drive unit to form a group with a plurality of micro drive units to operate collectively to transport the first load or the second load.

4. The micro drive unit of claim 3, wherein the micro drive unit is configured to perform at least one specialized function when operating collectively as part of the group with the plurality of micro drive units.

5. The micro drive unit of claim 4, wherein the at least one specialized function comprises at least one of:

a primary control unit,
a primary communication unit,
a primary power unit,
a primary sensing unit,
a primary navigation unit, or
a primary safety unit.

6. An apparatus, comprising:

a frame having a tileable shape;

a plurality of drive wheels coupled to the frame and rotated by respective drive motors; and a control system having a processor and a memory, the control system configured to at least:

instruct adjustment of the plurality of drive wheels between a first position at least partially extending from a lower surface of the frame and a second position at least partially extending from an upper surface of the frame;

wherein responsive to the plurality of drive wheels being in the first position, the apparatus is configured to receive and transport a first load via movement using the plurality of drive wheels; and wherein responsive to the plurality of drive wheels being in the second position, the apparatus is configured to receive and transport a second load via actuation of the plurality of drive wheels.

7. The apparatus of claim 6, wherein the tileable shape comprises a regular hexagonal prism having a width of approximately 300 mm and a height of approximately 150 mm.

8. The apparatus of claim 6, wherein the plurality of drive wheels comprise three sets of omnidirectional wheels that are offset approximately 120 degrees relative to each other around the frame.

9. The apparatus of claim 6, wherein the plurality of drive wheels are positioned substantially within an outer periphery of the frame.

10. The apparatus of claim 6, further comprising:

at least one vertical adjustment actuator configured to adjust a vertical position of the plurality of drive wheels between the first position and the second position relative to the frame; and wherein the control system is further configured to:

instruct actuation of the at least one vertical adjustment actuator to cause the adjustment of the plurality of drive wheels to selectively extend from the upper or lower surfaces of the frame.

11. The apparatus of claim 6, further comprising:

at least one upper module coupled to an upper portion of the frame, the at least one upper module comprising at least one of a tray, conveyor section, sortation section, lifting platform, turntable, or robotic arm; and wherein the control system is further configured to:

instruct actuation of the at least one upper module to receive and transport the first load.

12. The apparatus of claim 6, wherein the control system is further configured to:

instruct movement of the apparatus to a position associated with a desired arrangement to form a group based at least in part on attributes of the first load or the second load.

13. The apparatus of claim 12, wherein the group comprises a mobile group of a plurality of apparatus including the apparatus;

wherein the plurality of drive wheels of the apparatus are in the first position; and wherein the group collectively receives and transports the first load via movement of the group using respective drive wheels.

14. The apparatus of claim 12, wherein the group comprises a temporary conveyance formed by a plurality of apparatus including the apparatus;

wherein the plurality of drive wheels of the apparatus are in the first position; and wherein the group collectively receives and transports the first load via operation of upper modules of the group.

15. The apparatus of claim 12, wherein the group comprises a temporary motion field formed by a plurality of apparatus including the apparatus;

wherein the plurality of drive wheels of the apparatus are in the second position; and wherein the group collectively receives and transports the second load via rotation of respective drive wheels of the group that have been reconfigured by vertical adjustment actuators to respective second positions that at least partially extend from upper surfaces of the plurality of apparatus.

16. A method, comprising:

instructing adjustment of a plurality of drive wheels of an apparatus between a first position at least partially extending from a lower surface of a frame of the apparatus and a second position at least partially extending from an upper surface of the frame, the apparatus comprising the frame having a tileable shape, the plurality of drive wheels coupled to the frame and rotated by respective drive motors, and a control system having a processor and a memory;

wherein responsive to the plurality of drive wheels being in the first position, instructing the apparatus to receive and transport a first load via movement using the plurality of drive wheels; and wherein responsive to the plurality of drive wheels being in the second position, instructing the apparatus to receive and transport a second load via actuation of the plurality of drive wheels.

17. The method of claim 16, further comprising:

instructing the apparatus to form a group with a plurality of apparatus by:

determining a number and arrangement of the plurality of apparatus of the group to form a mobile group based at least in part on the first load;

instructing the plurality of apparatus to move to respective positions of the arrangement; and instructing transport of the first load by the group using respective drive wheels of the plurality of apparatus to navigate to a destination location.

18. The method of claim 16, further comprising:

instructing the apparatus to form a group with a plurality of apparatus by:

determining a number and arrangement of the plurality of apparatus of the group to form a temporary conveyance based at least in part on the first load;

instructing the plurality of apparatus to move to respective positions of the arrangement; and instructing transport of the first load by the group using respective upper modules of the plurality of apparatus to move the first load to a destination location.

19. The method of claim 16, further comprising:

instructing the apparatus to form a group with a plurality of apparatus by:

determining a number and arrangement of the plurality of apparatus of the group to form a temporary motion field based at least in part on the second load;

instructing the plurality of apparatus to move to respective positions of the arrangement;

instructing the plurality of apparatus to reconfigure respective drive wheels to respective second positions that at least partially extend from upper surfaces of the plurality of apparatus; and instructing transport of the second load by the group using respective drive wheels extending from the upper surfaces of the plurality of apparatus to move the second load to a destination location.

20. The method of claim 16, further comprising:

instructing the apparatus to move toward and load onto a mobile base station;

instructing transport of the apparatus to a destination location by movement of the mobile base station;

instructing recharging of the apparatus by a power supply associated with the mobile base station; and instructing the apparatus to unload from and move away from the mobile base station at the destination location.

* * * * *